(12) United States Patent
Ishii

(10) Patent No.: US 8,842,207 B2
(45) Date of Patent: Sep. 23, 2014

(54) SIGNAL PROCESSING APPARATUS AND IMAGE DATA GENERATION APPARATUS WITH ELECTRONIC REDUCTION AND ENLARGEMENT SIGNAL PROCESSING CAPABILITIES

(71) Applicant: Canon Kabushiki Kaisha, Tokyo (JP)

(72) Inventor: Yoshiki Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/721,954

(22) Filed: Dec. 20, 2012

(65) Prior Publication Data

US 2013/0107080 A1    May 2, 2013

Related U.S. Application Data

(63) Continuation of application No. 12/570,471, filed on Sep. 30, 2009, now Pat. No. 8,350,944, which is a continuation of application No. 10/790,930, filed on Mar. 1, 2004, now Pat. No. 7,602,425.

(30) Foreign Application Priority Data

Mar. 4, 2003   (JP) ................. 2003-057628

(51) Int. Cl.
| | |
|---|---|
| H04N 5/262 | (2006.01) |
| H04N 5/222 | (2006.01) |
| H04N 5/232 | (2006.01) |
| H04N 5/77 | (2006.01) |
| H04N 5/782 | (2006.01) |
| H04N 9/79 | (2006.01) |
| H04N 5/781 | (2006.01) |
| H04N 9/804 | (2006.01) |

(52) U.S. Cl.
CPC ............... *H04N 5/222* (2013.01); *H04N 5/782* (2013.01); *H04N 5/2628* (2013.01); *H04N 5/232* (2013.01); *H04N 5/772* (2013.01); *H04N 5/23296* (2013.01); *H04N 9/7921* (2013.01); *H04N 5/781* (2013.01); *H04N 9/8042* (2013.01)
USPC .................................... 348/333.02; 348/240.1

(58) Field of Classification Search
USPC ............... 348/240.99–240.3, 333.01, 333.02, 348/333.04
See application file for complete search history.

(56) References Cited

U.S. PATENT DOCUMENTS

| | | | | |
|---|---|---|---|---|
| 4,910,599 | A * | 3/1990 | Hashimoto | ............... 348/240.2 |
| 5,838,371 | A * | 11/1998 | Hirose et al. | ............... 348/240.2 |
| 6,181,377 | B1 * | 1/2001 | Kobayashi | ............... 348/333.02 |
| 6,289,178 | B1 * | 9/2001 | Kazami | ......................... 396/60 |
| 6,539,177 | B2 * | 3/2003 | Parulski | ...................... 396/287 |

(Continued)

*Primary Examiner* — Timothy J Henn
(74) *Attorney, Agent, or Firm* — Cowan, Liebowitz & Latman, P.C.

(57) ABSTRACT

A recording mode control circuit controls a first recording mode in which still image data having a first image size corresponding to the number of pixels of an image sensing element is generated and recorded and a second recording mode in which moving image data having a second image size smaller than the first image size is generated and recorded. In generating the moving image data in the second recording mode, a camera signal processing circuit executes electrical zoom processing to obtain the second image size. At this time, a maximum magnification ratio setting circuit sets the maximum variable magnification ratio of electrical zoom processing in the camera signal processing circuit. With this processing, an image recording apparatus which allows a user to select a zoom mode with a small degradation in image quality in electrical zoom processing can be implemented.

18 Claims, 27 Drawing Sheets

(56) References Cited

U.S. PATENT DOCUMENTS

| | | | |
|---|---|---|---|
| 6,643,416 B1 * | 11/2003 | Daniels et al. | 382/299 |
| 6,750,913 B1 * | 6/2004 | Noro et al. | 348/333.02 |
| 6,982,755 B1 * | 1/2006 | Kikuzawa | 348/241 |
| 7,046,290 B2 * | 5/2006 | Nozaki | 348/350 |
| 7,602,425 B2 * | 10/2009 | Ishii | 348/240.1 |
| 8,350,944 B2 * | 1/2013 | Ishii | 348/333.02 |
| 2001/0055066 A1 * | 12/2001 | Nozawa | 348/240 |
| 2003/0103156 A1 * | 6/2003 | Brake et al. | 348/333.01 |

* cited by examiner

F I G. 13
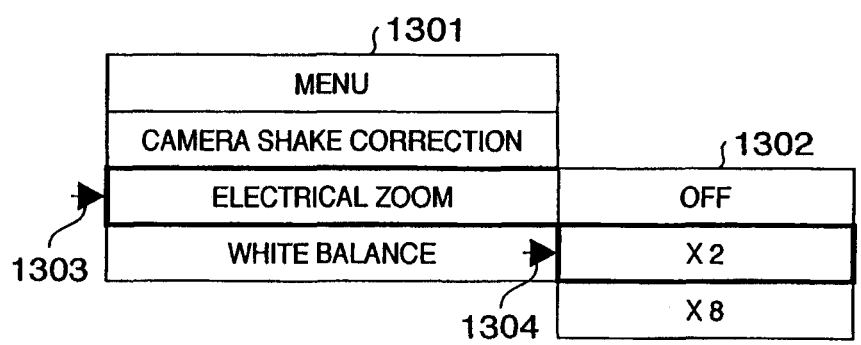

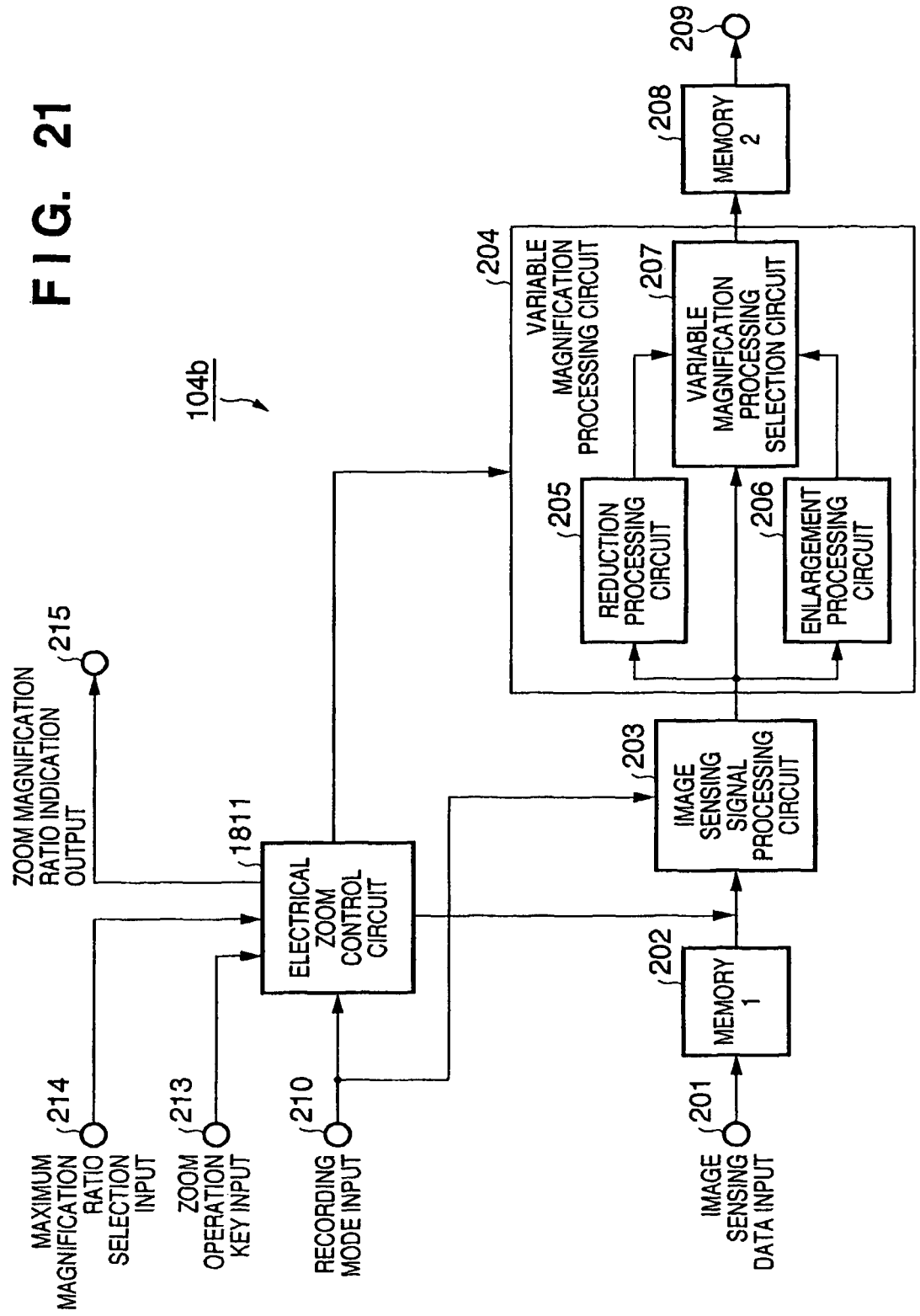

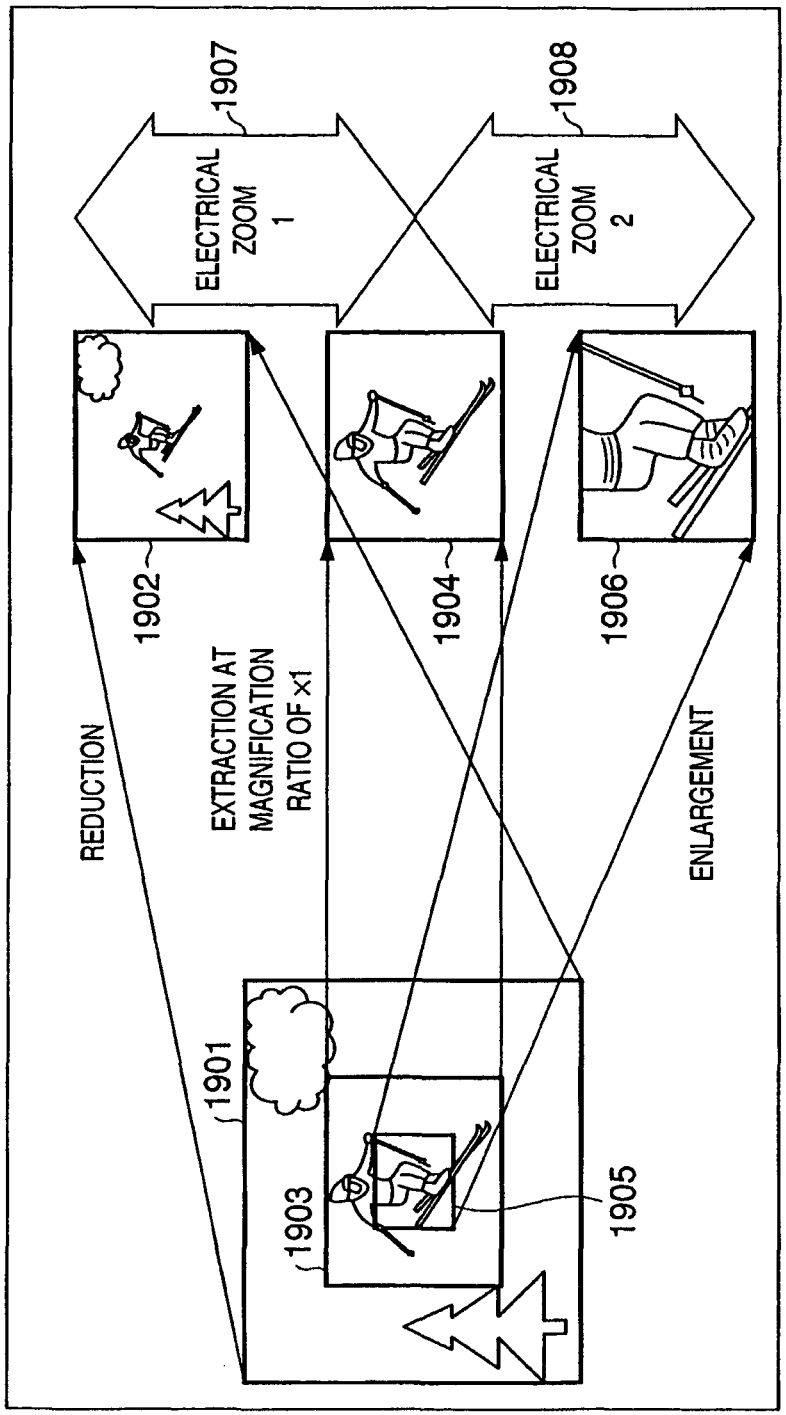

F I G. 24A 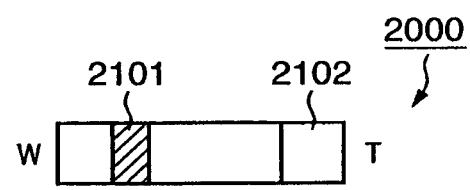
F I G. 24B 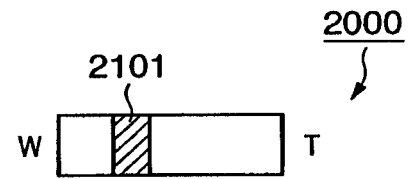

F I G. 25
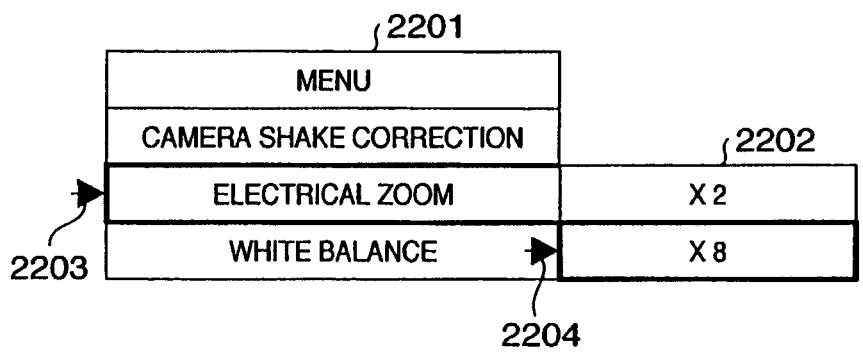

SIGNAL PROCESSING APPARATUS AND IMAGE DATA GENERATION APPARATUS WITH ELECTRONIC REDUCTION AND ENLARGEMENT SIGNAL PROCESSING CAPABILITIES

CROSS-REFERENCE TO RELATED APPLICATIONS

This application is a continuation of application Ser. No. 12/570,471, filed Sep. 30, 2009, which is a continuation of application Ser. No. 10/790,930, filed Mar. 1, 2004, now U.S. Pat. No. 7,602,425, which claims priority of Japanese Application No. 2003-057628, filed Mar. 4, 2003, the entire disclosures of which are hereby incorporated by reference.

FIELD OF THE INVENTION

The present invention relates to a signal processing apparatus and an image data generation apparatus that have both optical and electrical zoom means.

BACKGROUND OF THE INVENTION

In recent years, image recording apparatuses (or signal processing apparatuses or image data generation apparatuses) such as digital video cameras and digital (still) cameras are widely used in the ordinary household. Such image recording apparatuses generally have a zoom function capable of continuously changing the photographing view angle from a wide-angle mode to a telephoto mode by user operation. Many image recording apparatuses have even an electrical zoom function of electronically variably magnifying photographing image data in addition to a conventional optical zoom function using a zoom lens optical system.

FIG. 26 is a block diagram showing the schematic arrangement of a conventional image recording apparatus having an optical zoom function and an electrical zoom function. Referring to FIG. 26, a lens optical system 2301 includes an optical lens which forms an image of incident light on an image sensing element 2302, an aperture, a focus controller, various kinds of optical filters, and a driving mechanism for them. The lens optical system 2301 can execute optical zoom for optically changing the view angle and includes a driving mechanism for it.

The above-described optical mechanism in the lens optical system 2301 of the image recording apparatus shown in FIG. 26 is a common mechanism, and a description thereof will be omitted. The image sensing element 2302 converts the optical signal of an image formed on the light-receiving surface by the lens optical system 2301 into an electrical signal. For example, a CCD (Charge Coupled Device) and a CMOS (Complementary Metal Oxide Semiconductor) sensor are known.

An A/D (Analog-to-Digital conversion) circuit 2303 converts the image sensing signal, which has been converted into an electrical signal by the image sensing element 2302, into digital image sensing data (to be referred to as image sensing data hereinafter). A memory 1 (2304) stores the image sensing data converted by the A/D circuit 2303. At this point of time, the image sensing data is digital data in an output format unique to the image sensing element (the output format changes depending on the pixel array and the color filter array). A camera signal processing circuit 2305 executes various processing operations for converting the image sensing data supplied from the memory 1 (2304) into image data. A zoom control circuit 2307 controls an optical zoom control circuit 2306 in accordance with input from a zoom operation key 2310. The zoom control circuit 2307 also controls an enlargement processing circuit 2309 through a switch 2308. The optical zoom control circuit 2306 controls the lens optical system 2301 to perform optical zoom under the control of the zoom control circuit 2307. The enlargement processing circuit 2309 executes electrical zoom processing under the control of the zoom control circuit 2307. That is, the zoom control circuit 2307 allows optical zoom or electrical zoom processing.

An electrical zoom ON/OFF switch 2311 turns on/off the electrical zoom function. When the electrical zoom ON/OFF switch 2311 is OFF, the switch 2308 is turned off to inhibit the enlargement processing circuit 2309 from executing enlargement processing. When the electrical zoom ON/OFF switch 2311 is ON, the switch 2308 is turned on to cause the enlargement processing circuit 2309 to execute enlargement processing. The electrical zoom ON/OFF switch 2311 is prepared for users who dislike a degradation in image quality due to enlargement by electrical zoom so that photographing can be executed while setting the zoom control mode for only optical zoom.

A memory 2 (2312) stores image data which has undergone camera signal processing and enlargement processing. A recording signal processing circuit 2313 executes compression-coding, recording format generation, error-correcting coding, or recording modulation coding for the image data read out from the memory 2 (2312). A recording medium 2314 records the image data processed by the recording signal processing circuit 2313.

The optical zoom and electrical zoom operations in the image recording apparatus shown in FIG. 26 will be described next.

FIG. 27 is a view showing the optical zoom and electrical zoom operations in the image recording apparatus shown in FIG. 26. A frame 2401 indicates the range of the object (including a tree, a skier, and a cloud) of image data stored in the memory 1 (the frame 2401 indicates the view angle). The frame 2401 becomes large as the optical zoom shifts to the wide-angle side. More specifically, in a zoom control region 2406 for optical zoom, when the lens optical system 2301 is controlled to the maximum wide-angle state, the frame 2401 becomes large. At that view angle, a wide-angle image 2403 is obtained. Accordingly, the image data of the object indicated by the wide-angle image 2403 is stored in the memory 1. In the zoom control region 2406, when the lens optical system 2301 is controlled to the maximum telephoto state, a telephoto image 2404 is obtained at the view angle corresponding to the frame 2401. Accordingly, the image data of the object indicated by the telephoto image 2404 is stored in the memory 1. As described above, the image recording apparatus shown in FIG. 26 executes the zoom operation by changing the photographing view angle (the range of the frame 2401) by controlling the lens optical system 2301.

On the other hand, in a zoom control region 2407 for electrical zoom, a partial area indicated by a frame 2402 is extracted and enlarged from the image data of the object within the frame 2401 in the maximum telephoto state, thereby obtaining an electrical zoom image 2405.

At this time, the image quality degrades to some extent in electrical zoom processing, as described above. Especially, when the magnification ratio of electrical zoom is high, the image quality largely degrades. To prevent this, the magnification ratio of electrical zoom is generally limited by defining an upper limit value.

There is also disclosed an information recording apparatus (image recording apparatus) capable of preventing any unintentional degradation in image quality by excessive electrical zoom processing (e.g., Japanese Patent Laid-Open No. 2001-197347). In this apparatus, when electrical zoom processing may cause an undesirable degradation in image quality, the electrical zoom processing is restricted, or a warning is displayed.

More specifically, the information recording apparatus comprises an image sensing unit which senses an image, and an electrical zoom processing unit which acquires a selected image within a predetermined range from the image obtained by the image sensing unit and converts the selected image into an output image having a predetermined number of pixels. The electrical zoom processing unit has a selection range condition setting function of setting a condition to be satisfied by the selected image by referring to the number of pixels of the output image. The apparatus further comprises a notification unit which notifies a user that the condition is not satisfied when the selected image does not satisfy the condition. With the above-described arrangement, when electrical zoom processing may cause an undesirable degradation in image quality, the electrical zoom processing can be restricted, or a warning can be displayed.

Some signal processing apparatuses and image data generation apparatuses, which have come along in recent years, record reduced image data smaller than the image size of the image sensing element in some recording modes, as in the moving image photographing mode of a digital video camera having a still image photographing function. In such signal processing apparatuses and image data generation apparatuses, even when photographing is performed by setting for only optical zoom, the image data is further reduced electronically and recorded in some recording modes. That is, setting for electrical zoom is not done in consideration of the electronic reduction. In other words, it is inconsistent with the primary purpose of the photographing mode which prevents, by electrical zoom ON/OFF setting, the degradation in image quality by enlargement processing.

SUMMARY OF THE INVENTION

The present invention has been made in consideration of the above-described problem, and has as its main object to provide a signal processing apparatus and an image data generation apparatus, which allow a user to select a zoom mode with a small degradation in image quality in electrical zoom processing.

According to an aspect of the present invention, signal processing apparatus which changes a magnification ratio of an image acquired by image sensing means, characterized by comprising: first signal processing means for executing first signal processing for reducing an image sensing signal with respect to a scanning range of an obtained image sensing surface when the magnification ratio of the image is to be increased; second signal processing means for executing second signal processing different from the first signal processing to change the magnification ratio of the image; first detection means for detecting selection of one of a telephoto side and a wide-angle side; second detection means for detecting a limit of an increase in magnification ratio of the image by the first signal processing; and selection means for selecting one of a first mode and a second mode; wherein when the first mode is selected by the selection means, and the first detection means detects that the telephoto side is continuously selected, the first signal processing is executed, and when the second detection means detects that the increase in magnification ratio of the image by the first signal processing has reached the limit, the second signal processing is subsequently executed to enlarge the image, and when the second mode is selected by the selection means, even when the second detection means detects that the increase in magnification ratio of the image by the first signal processing has reached the limit, and the first detection means then detects that the telephoto side is continuously selected, the second signal processing is inhibited.

According to another aspect of the present invention, an image recording apparatus characterized by comprising a signal processing apparatus of the present invention; and optical variable magnification means for changing a view angle of an object image formed on a light-receiving surface of image sensing means, wherein variable magnification by the optical variable magnification means is executed in first signal processing.

According to further aspect of the present invention, an image data generation apparatus which generates image data on the basis of image sensing data photographed by an image sensing element, characterized by comprising: recording mode control means for controlling a first recording mode in which image data in a first image format having a first image size corresponding to the number of pixels of the image sensing element is generated and recorded, and a second recording mode in which image data in a second image format having a second image size smaller than the first image size is generated and recorded; electronic variable magnification means for executing electronic variable magnification processing in generating the image data in the second image format in the second recording mode; maximum variable magnification ratio setting means for setting a maximum variable magnification ratio in the electronic variable magnification means; and variable magnification ratio change indication means for indicating a change in variable magnification ratio while defining, as a maximum value, the maximum variable magnification ratio set by the maximum variable magnification ratio setting means, wherein the maximum variable magnification ratio setting means sets, as the maximum variable magnification ratio, a maximum variable magnification ratio candidate selected by a user from a plurality of types of maximum variable magnification ratio candidates, and the variable magnification ratio change indication means indicates, as a boundary line, a value of a maximum variable magnification ratio candidate whose variable magnification ratio is lower than that of the maximum variable magnification ratio.

According to yet further aspect of the present invention, a signal processing method of changing a magnification ratio of an image acquired by image sensing means, characterized by comprising: a first signal processing step of executing first signal processing for reducing an image sensing signal with respect to a scanning range of an obtained image sensing surface when the magnification ratio of the image is to be increased; a second signal processing step of executing second signal processing different from the first signal processing step to change the magnification ratio of the image; a first detection step of detecting selection of one of a telephoto side and a wide-angle side; a second detection step of detecting a limit of an increase in magnification ratio of the image by the first signal processing step; and selection step of selecting one of a first mode and a second mode; wherein in the selection step, when the first mode is selected, and it is detected in the first detection step that the telephoto side is continuously selected, the first signal processing is executed, and when it is detected in the second detection step that the increase in magnification ratio of the image by the first signal processing has reached the limit, the second signal processing is subsequently executed to enlarge the image, and when the second mode is selected, even when it is detected in the second detection step that the increase in magnification ratio of the image by the first signal processing has reached the limit, and it is then detected in the first detection step that movement from the wide-angle side to the telephoto side is continuously selected, the second signal processing is inhibited.

According to another aspect of the present invention, an image data generation method for generating image data on the basis of image sensing data photographed by an image sensing element, characterized by comprising: a recording mode control step of controlling a first recording mode in which image data in a first image format having a first image size corresponding to the number of pixels of the image sensing element is generated and recorded, and a second recording mode in which image data in a second image format having a second image size smaller than the first image size is generated and recorded; an electronic variable magnification step of executing electronic variable magnification processing in generating the image data in the second image format in the second recording mode; a maximum variable magnification ratio setting step of setting a maximum variable magnification ratio in the electronic variable magnification step; and a variable magnification ratio change indication step of indicating a change in variable magnification ratio while defining, as a maximum value, the maximum variable magnification ratio set in the maximum variable magnification ratio setting step, wherein in the maximum variable magnification ratio setting step, a maximum variable magnification ratio candidate selected by a user from a plurality of types of maximum variable magnification ratio candidates is set as the maximum variable magnification ratio, and in the variable magnification ratio change indication step, a value of a maximum variable magnification ratio candidate whose variable magnification ratio is lower than that of the maximum variable magnification ratio is indicated as a boundary line.

According to another aspect of the present invention, a program for a signal processing apparatus which changes a magnification ratio of an image acquired by image sensing means, characterized by comprising: a first signal processing step of executing first signal processing for reducing an image sensing signal with respect to a scanning range of an obtained image sensing surface when the magnification ratio of the image is to be increased; a second signal processing step of executing second signal processing different from the first signal processing step to change the magnification ratio of the image; a first detection step of detecting selection of one of a telephoto side and a wide-angle side; a second detection step of detecting a limit of an increase in magnification ratio of the image by the first signal processing step; and selection step of selecting one of a first mode and a second mode; wherein the signal processing apparatus is caused to, in the selection step, when the first mode is selected, and it is detected in the first detection step that the telephoto side is continuously selected, execute the first signal processing, and when it is detected in the second detection step that the increase in magnification ratio of the image by the first signal processing has reached the limit, subsequently execute the second signal processing to enlarge the image, and when the second mode is selected, even when it is detected in the second detection step that the increase in magnification ratio of the image by the first signal processing has reached the limit, and it is then detected in the first detection step that movement from the wide-angle side to the telephoto side is continuously selected, inhibit the second signal processing.

According to still another aspect of the present invention, a program for an image data generation apparatus which generates image data on the basis of image sensing data photographed by an image sensing element, characterized by comprising: a recording mode control step of controlling a first recording mode in which image data in a first image format having a first image size corresponding to the number of pixels of the image sensing element is generated and recorded, and a second recording mode in which image data in a second image format having a second image size smaller than the first image size is generated and recorded; an electronic variable magnification step of executing electronic variable magnification processing in generating the image data in the second image format in the second recording mode; a maximum variable magnification ratio setting step of setting a maximum variable magnification ratio in the electronic variable magnification step; and a variable magnification ratio change indication step of indicating a change in variable magnification ratio while defining, as a maximum value, the maximum variable magnification ratio set in the maximum variable magnification ratio setting step, wherein the image data generation apparatus is caused to, in the maximum variable magnification ratio setting step, setting, as the maximum variable magnification ratio, a maximum variable magnification ratio candidate selected by a user from a plurality of types of maximum variable magnification ratio candidates, and in the variable magnification ratio change indication step, indicating, as a boundary line, a value of a maximum variable magnification ratio candidate whose variable magnification ratio is lower than that of the maximum variable magnification ratio.

According to another aspect of the present invention, an image sensing apparatus which has an optical zoom function and an electrical zoom function and in which a sensed image at a photographing magnification ratio covered by the optical zoom function is recorded as a reduced image obtained by reducing the sensed image to an image having a predetermined number of pixels smaller than the number of pixels of the sensed image, and when photographing at a magnification ratio more than a maximum photographing magnification ratio covered by the optical zoom function is instructed, an image generated from the sensed image by using the electrical zoom function is recorded, characterized by comprising: storage means for storing a set value representing, of photographing magnification ratios that the electrical zoom function copes with, a maximum magnification ratio to be used in image sensing; first electrical zoom means for extracting the image having the predetermined number of pixels from the sensed image to obtain an enlarged image; second electrical zoom means for extracting a partial image of the enlarged image and enlarging the partial image to the image having the predetermined number of pixels to obtain an enlarged image; and switching means for switching, in accordance with the set value, between image sensing which is to be executed by using both of the first electrical zoom means and the second electrical zoom means and image sensing which is to be executed by using only the first electrical zoom means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a view showing a detailed example of a maximum magnification ratio selection switch 111;

FIG. 21 is a block diagram for explaining details of a camera signal processing circuit 104b shown in FIG. 20;

FIG. 22 is a view showing the outline of a zoom processing operation in the digital video camera shown in FIG. 20;

FIGS. 24A and 24B are views showing examples of a zoom magnification ratio indicator 2000 different from FIGS. 23A and 23B;

FIG. 25 is a view showing a detailed example of a maximum magnification ratio selection switch 111a;

DETAILED DESCRIPTION OF THE PREFERRED EMBODIMENTS

Preferred embodiments of the present invention will now be described in detail in accordance with the accompanying drawings.

The schematic arrangement of a digital video camera (an image recording apparatus, signal processing apparatus, or image data generation apparatus) according to the first embodiment of the present invention will be described first. The digital video camera of this embodiment can photograph both a still image and a moving image.

Figure 1:
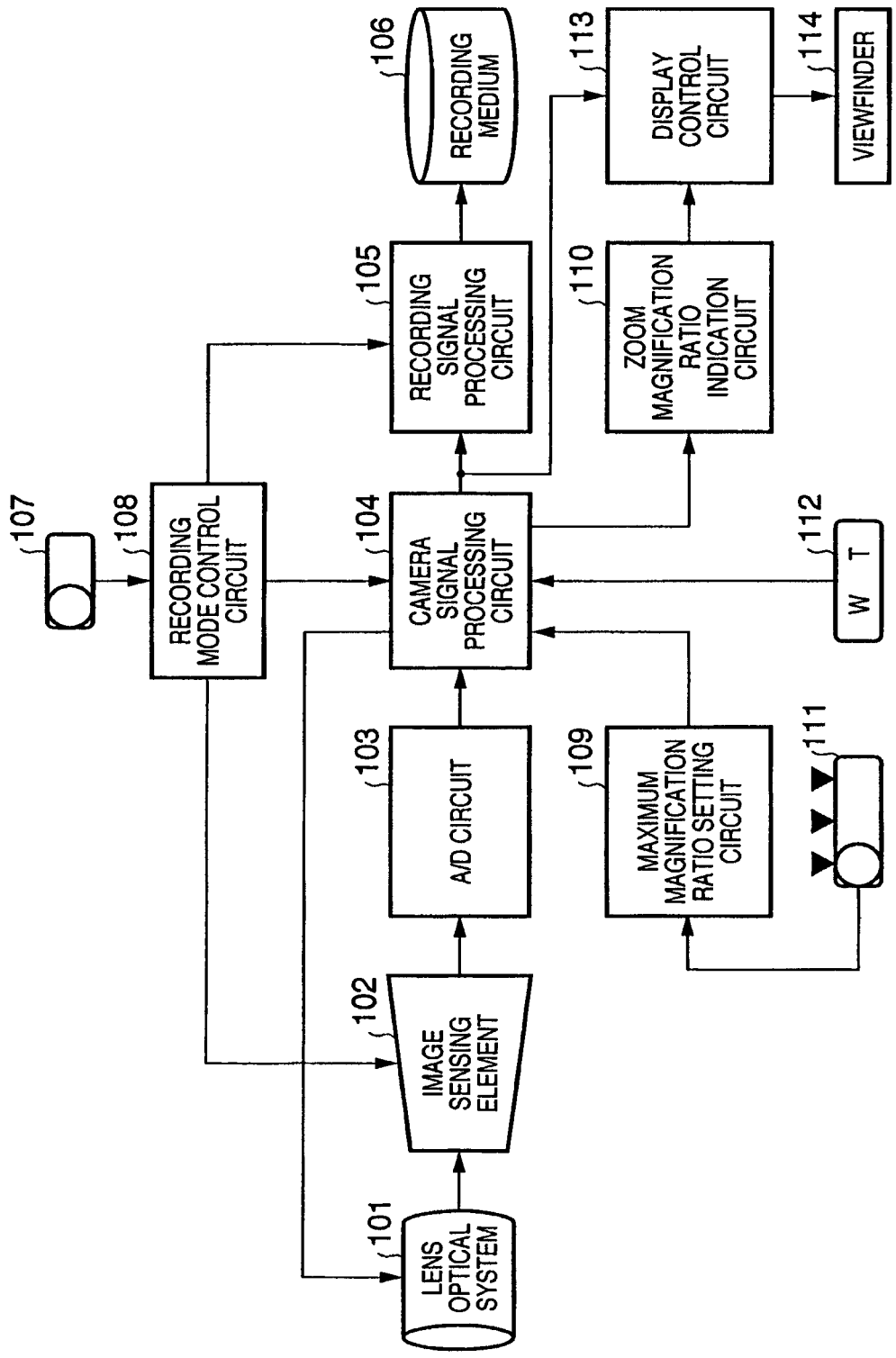
FIG. 1 is a block diagram showing the schematic arrangement of a digital video camera according to the first embodiment of the present invention.

FIG. 1 is a block diagram showing the schematic arrangement of the digital video camera according to the first embodiment of the present invention. Referring to FIG. 1, a lens optical system 101 includes an optical lens which forms an image of incident light on an image sensing element 102, an aperture, a focus controller, various kinds of optical filters, and a driving mechanism for them. The lens optical system 101 can execute optical zoom for optically changing the view angle and includes a driving mechanism for it. The above-described optical mechanism in the lens optical system 101 of the digital video camera shown in FIG. 1 is a common mechanism, and a detailed description thereof will be omitted.

The image sensing element 102 converts the optical signal of an image formed on the light-receiving surface by the lens optical system 101 into an electrical signal. Examples of the image sensing element 102 are a CCD (Charge Coupled Device) and a CMOS (Complementary Metal Oxide Semiconductor) sensor. An A/D (Analog/Digital) circuit 103 analog/digital-converts the image sensing signal, which has been converted into an electrical signal by the image sensing element, into digital image sensing data (to be referred to as image sensing data hereinafter). At this point of time, the image sensing data is digital data in an output format unique to the image sensing element 102 (the output format changes depending on the pixel array, the color filter array, and the pixel charge read method).

A camera signal processing circuit 104 executes various processing operations for converting the image sensing data supplied from the A/D circuit 103 into image data. The camera signal processing circuit 104 also controls the optical zoom driving mechanism of the lens optical system 101 to execute optical zoom. The processing executed by the camera signal processing circuit 104 will be described later in detail. A recording signal processing circuit 105 executes compression-coding, recording format generation, error-correcting coding, or recording modulation coding for the image data converted by the camera signal processing circuit 104. The recording signal processing circuit 105 outputs recording image data to be recorded in a recording medium. A recording medium 106 records the recording image data generated by the recording signal processing circuit 105. Examples of the recording medium 106 are a flexible disk and a magnetic tape.

A recording mode switch 107 can be switched by a user to set a recording mode. In a recording mode of this embodiment, the type of image data to be recorded is switched between still image data and moving image data, or the recording image size is changed. A recording mode control circuit 108 controls the contents of processing by the driving circuit of the image sensing element 102, the camera signal processing circuit 104, and the recording signal processing circuit 105 in accordance with the setting of the recording mode switch 107. The processing in the recording mode control circuit 108 will be described later in detail.

Figure 10:
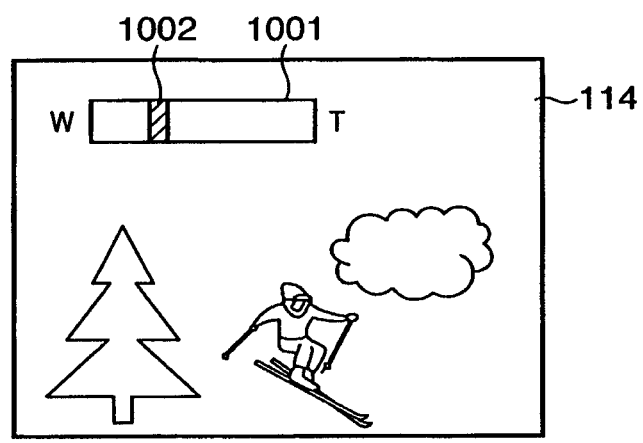
FIG. 10 is a view showing an example of zoom magnification ratio indication on a viewfinder 114 in which a photographing image is confirmed.

A maximum magnification ratio setting circuit 109 sets the maximum magnification ratio in a zoom operation in accordance with the setting of a maximum magnification ratio selection switch 111. The setting by the maximum magnification ratio setting circuit 109 will be described later in detail. A zoom magnification ratio indication circuit 110 displays information related to the zoom magnification ratio on a viewfinder 114 (to be described later). More specifically, as shown in FIG. 10, a character representing the current zoom magnification ratio is displayed (displayed as an indicator) on a scale representing the maximum wide-angle state and the maximum telephoto state. FIG. 10 will be described later in detail. With a zoom operation key 112, the operator inputs the zoom operation between the wide-angle state and the telephoto state.

A display control circuit 113 displays an image, which is being photographed, on the viewfinder 114 on the basis of image data output from the camera signal processing circuit 104, or displays the zoom magnification ratio for the zoom magnification ratio indication circuit 110 on the viewfinder 114. The viewfinder 114 is a display circuit on which various kinds of information are displayed under the control of the display control circuit 113. An example of the viewfinder 114 is a liquid crystal display circuit.

The digital video camera shown in FIG. 1 comprises not only the components shown in FIG. 1 but also constituent components prepared in common digital video cameras, including a system controller, a recording medium driving circuit, and a user interface circuit. However, these constituent components are unnecessary for the description of the embodiment of the present invention and therefore are not illustrated.

Figure 8:
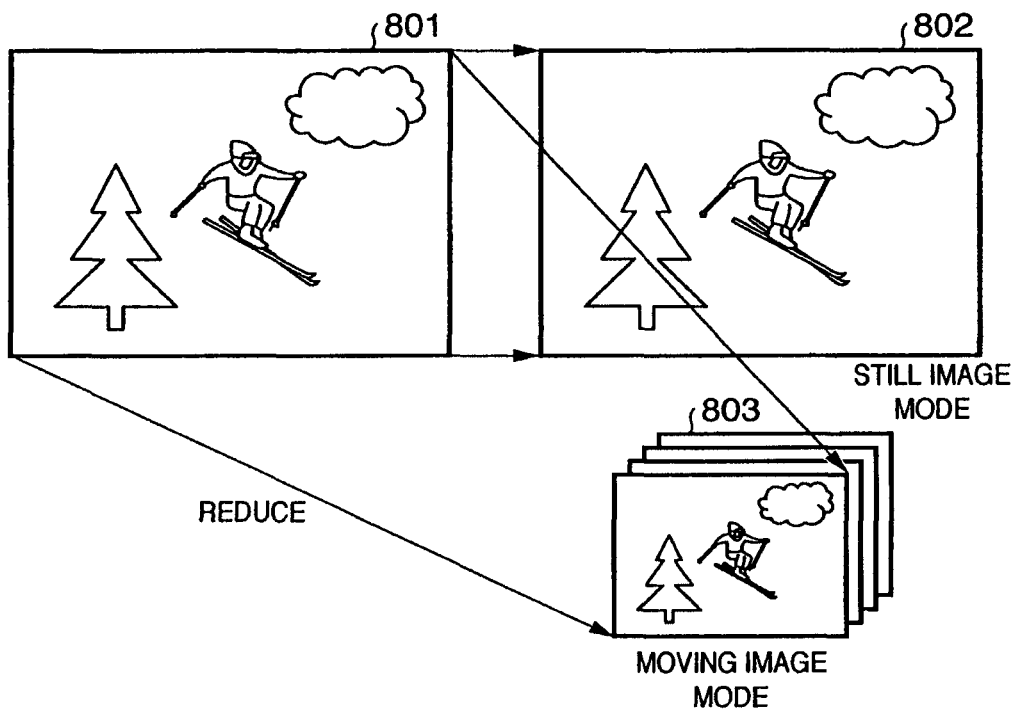
FIG. 8 is a view showing the outline of still image/moving image mode change in the digital video camera shown in FIG. 1.

The processing in the recording mode control circuit 108 in the digital video camera shown in FIG. 1 will be described in detail. The digital video camera shown in FIG. 1 has a still image mode in which a still image is photographed and a moving image mode in which a moving image is photographed, as described above. When the operator switches the recording mode switch 107, the mode can be changed between the still image mode and the moving image mode under the control of the recording mode control circuit 108. FIG. 8 is a view showing the outline of still image/moving image mode change in the digital video camera shown in FIG. 1.

Referring to FIG. 8, a sensing image size 801 represents the image size of image sensing data obtained by causing the A/D circuit 103 to convert an image sensing signal output from the image sensing element 102 into digital data. A still image size 802 represents the image size of still image data which is generated by the digital video camera on the basis of image sensing data when the recording mode is the still image mode. A moving image size 803 represents the image size of moving image data which is generated by the digital video camera on the basis of image sensing data when the recording mode is the moving image mode.

An image size is defined by the total number of pixel data contained in image data. As shown in FIG. 8, for the still image size 802, camera signal processing is executed in the same image size as the sensing image size 801. However, for the moving image size 803, camera signal processing is executed in an image size obtained by reducing the sensing image size 801 in accordance with the moving image data format.

The reason why image size reduction processing is necessary in the moving image mode, as described above, will be described below. In, e.g., a digital video format (to be referred to as a DV format hereinafter), the image size of moving image data is predetermined. For this reason, if the image size of image sensing data is larger than the predetermined size, the image data must be reduced to the predetermined size. Hence, the digital video camera shown in FIG. 1 reduces image data to the image size corresponding to the DV format in the moving image mode.

To the contrary, the image size of still image data photographed in the still image mode is not particularly predetermined in the still image format. Still image data can be recorded up to the maximum image size defined by each digital video camera.

An example of the driving processing of the image sensing element 102 corresponding to switching between the still image mode and the moving image mode described above is switching between a cumulative read in the moving image mode and a non-cumulative read in the still image mode. In addition, as the processing by the recording signal processing circuit 105 corresponding to switching between the still image mode and the moving image mode, switching is executed between compression-coding, recording format generation, error-correcting coding, and modulation coding corresponding to each of the DV format and still image format defined by setting the still or moving image mode.

In the following description, the first recording mode is the still image mode, and the second recording mode is the moving image mode. The first and second recording modes are not limited to the above-described modes and can be two recording modes using different electronic enlargement/reduction processes. For example, the first recording mode is the above-described mode (still image mode), and the second recording mode may be a still image reduction recording mode in which still image data is electronically reduced.

The camera signal processing circuit 104 shown in FIG. 1 will be described next in detail.

Figure 2:
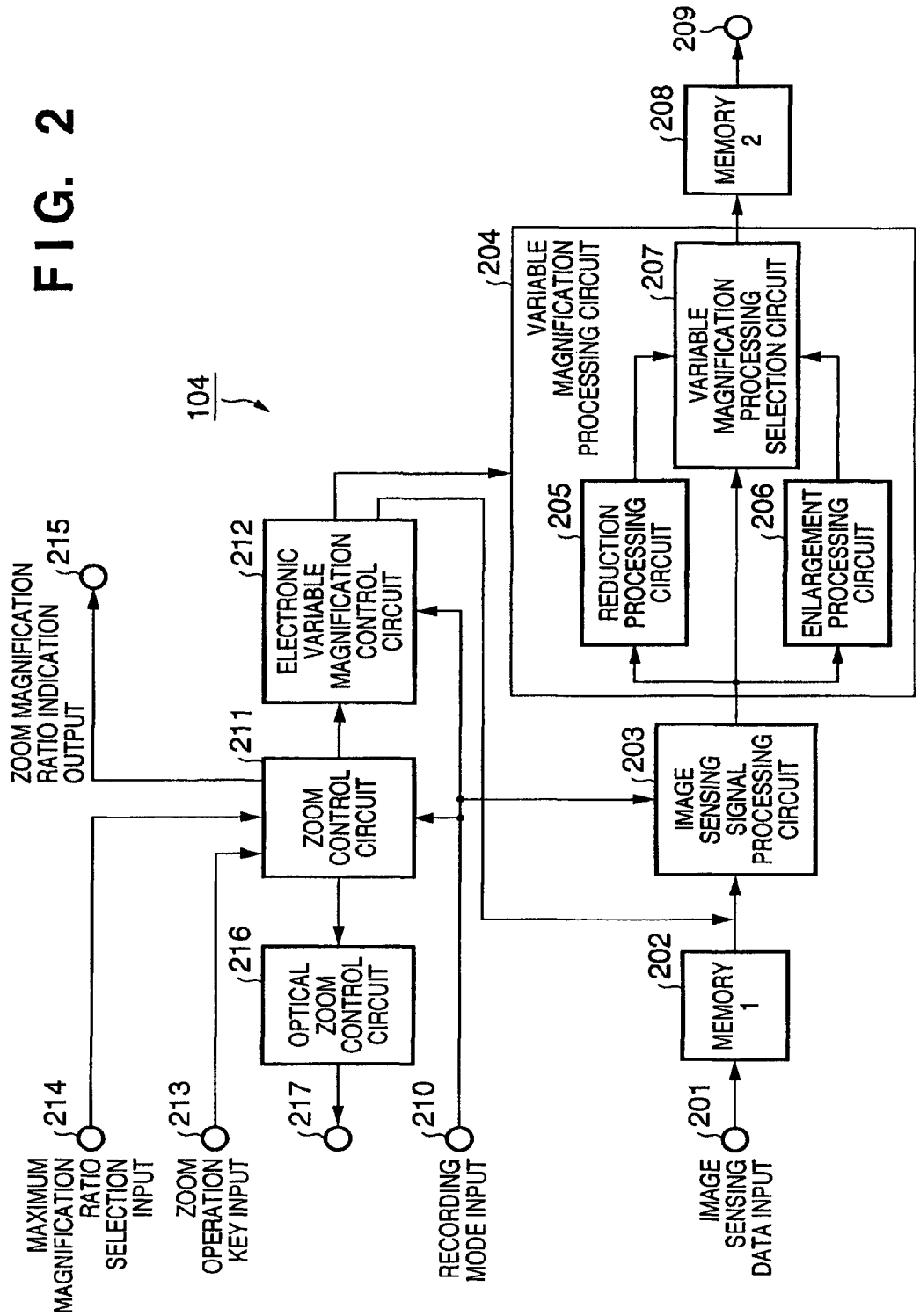
FIG. 2 is a block diagram showing details of a camera signal processing circuit 104 shown in FIG. 1.

FIG. 2 is a block diagram showing details of the camera signal processing circuit 104 shown in FIG. 1. Referring to FIG. 2, an image sensing data input terminal 201 is connected to the output terminal of the A/D circuit 103 to receive image sensing data output from the A/D circuit 103. A memory 1 (202) is a storage circuit which holds the image sensing data input to the image sensing data input terminal 201. The image sensing data held in the memory 1 (202) has a format which changes depending on the structure or driving method of the image sensing element 102, as described above. An example of the format of the image sensing data is a data format determined by the color filter array of a color image sensing element.

An image sensing signal processing circuit 203 converts the image sensing data held in the memory 1 (202) into an image data format for recording or an intermediate image data format for the next processing. More specifically, since image sensing element 102 of this embodiment is a color image sensing element, the image sensing signal processing circuit 203 executes matrix conversion processing from the image sensing data to image data in the RGB format or image data in the Y(R-Y)(B-Y) format, interpolation processing for the color filter array, white balance processing, and γ conversion processing. The conversion parameters of these processing operations are controlled by recording mode data supplied from a recording mode input terminal 210 (to be described later).

A variable magnification processing circuit 204 executes enlargement/reduction processing for the image data output from the image sensing signal processing circuit 203 and outputs the variably magnified image data. More specifically, the variable magnification processing circuit 204 comprises a reduction processing circuit 205, enlargement processing circuit 206, and variable magnification processing selection circuit 207. The reduction processing circuit 205 executes reduction processing for the image data and outputs reduced image data. It is detected whether the reduction processing for the image data has reached its limit. If it is detected that the reduction processing for the image data has reached the limit, the enlargement processing circuit 206 executes enlargement processing for the image data and outputs enlarged image data. The variable magnification processing selection circuit 207 selects one of the image data, reduced image data, and enlarged image data in accordance with the mode and outputs variably magnified image data. A memory 2 (208) holds the variable magnified image data output from the variable magnification processing circuit 204. A terminal 209 outputs the variably magnified image data (image data in the second image format) held in the memory 2.

Recording mode data from the recording mode control circuit 108 shown in FIG. 1 is input to the recording mode input terminal 210 (to be referred to as the terminal 210 hereinafter). More specifically, recording mode data which designates the first recording mode (still image recording mode) or the second recording mode (moving image mode) is input. The above-described image sensing signal processing circuit 203 executes signal processing corresponding to the recording mode data input from the terminal 210. More specifically, the image sensing signal processing circuit 203 executes processing for generating still image data from the image sensing data in accordance with the first recording mode (still image mode) or processing for generating reduced moving image data from the image sensing data in accordance with the second recording mode (moving image mode). A zoom control circuit 211 and an electronic variable magnification control circuit 212 (both will be described later) control a zoom operation corresponding to the recording mode data input from the terminal 210.

The zoom control circuit 211 determines the zoom magnification ratio in accordance with zoom operation key input data from a zoom operation key input terminal 213 (to be referred to as a terminal 213 hereinafter) and controls an optical zoom control circuit 216 (to be described later) and the electronic variable magnification control circuit 212 in a mode corresponding to the determined zoom magnification ratio to execute the zoom operation. The electronic variable magnification control circuit 212 controls variable magnification processing by the variable magnification processing circuit 204 in accordance with an instruction from the zoom control circuit 211. The electronic variable magnification control circuit 212 also controls the method of reading out the image sensing data from the memory 1 (202), as needed. The processing in the zoom control circuit 211 and electronic variable magnification control circuit 212 will be described later in detail.

A maximum magnification ratio selection value by the maximum magnification ratio setting circuit 109 shown in FIG. 1 is input to a maximum magnification ratio selection input terminal 214 (to be referred to as a terminal 214 hereinafter). The maximum magnification ratio selection value input to the terminal 214 is processed by the zoom control circuit 211 in accordance with the mode corresponding to the selection value. A zoom magnification ratio indication output terminal 215 (to be referred to as a terminal 215 hereinafter) is connected to the input terminal of the zoom magnification ratio indication circuit 110 to output zoom magnification ratio indication data to it. The optical zoom control circuit 216 executes optical zoom by controlling the lens optical system 101 in accordance with an instruction from the zoom control circuit 211. An optical zoom output terminal 217 (to be referred to as a terminal 217 hereinafter) is connected to the lens optical system 101 to output optical zoom data, which is output from the optical zoom control circuit 216 to control the optical zoom processing, to the lens optical system 101.

With the above arrangement, the camera signal processing circuit 104 converts image sensing data into still image data in the still image format in accordance with the first recording mode, converts image sensing data into moving image data in the moving image format in accordance with the second recording mode, or executes processing related to optical zoom or electrical zoom.

Figure 3:
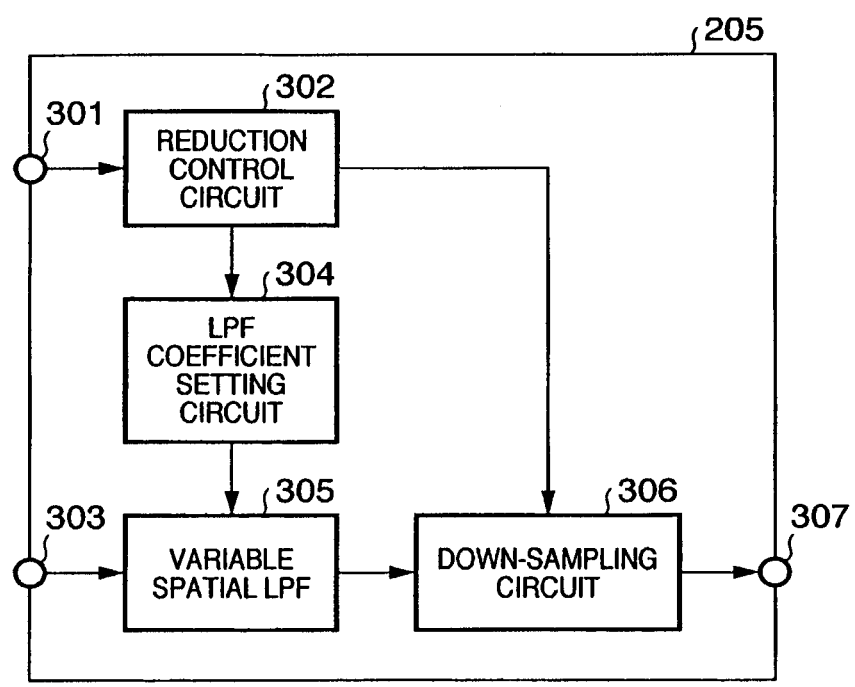
FIG. 3 is a block diagram showing the schematic arrangement of a reduction processing circuit 205 shown in FIG. 2.

The arrangement of the reduction processing circuit (a first electronic variable magnification means serving as a first signal processing means) 205 shown in FIG. 2 will be described next. FIG. 3 is a block diagram showing the schematic arrangement of the reduction processing circuit 205 shown in FIG. 2. Referring to FIG. 3, an input terminal 301 is connected to the electronic variable magnification control circuit 212 shown in FIG. 2 to receive electronic variable magnification control data from it. A reduction control circuit 302 specifies the variable magnification ratio from the electronic variable magnification control data which corresponds to the mode and is input from the electronic variable magnification control circuit 212 through the input terminal 301. The reduction control circuit 302 controls an LPF (Low-Pass Filter) coefficient setting circuit 304 (to be described later) in accordance with the variable magnification ratio. The reduction control circuit 302 also controls a down-sampling circuit 306 (to be described later) in accordance with the variable magnification ratio.

An input terminal 303 is connected to the image sensing signal processing circuit 203 shown in FIG. 2 to receive image data from it. A variable spatial LPF (Low-Pass Filter) 305 limiting the band of the image data input from the image sensing signal processing circuit 203 through the input terminal 303 to prevent aliasing (aliasing of a high-frequency component) due to reduction processing. The LPF coefficient setting circuit 304 sets an LPF coefficient corresponding to the reduction ratio in the variable spatial LPF 305 under the control of the reduction control circuit 302.

Figure 4:
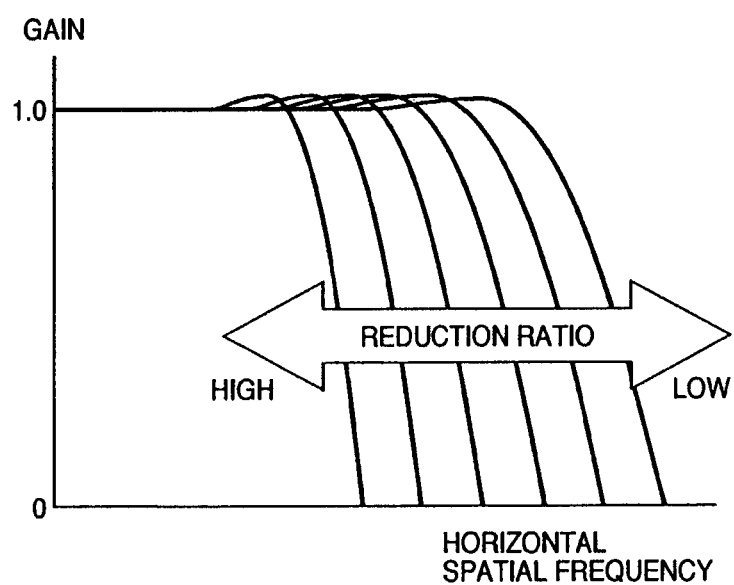
FIG. 4 is a graph showing a setting example of a variable spatial LPF in the horizontal direction corresponding to the reduction ratio.

An example of a method of setting an LPF coefficient corresponding to a reduction ratio will be described. FIG. 4 is a graph showing a setting example of a variable spatial LPF in the horizontal direction corresponding to the reduction ratio. Generally, aliasing can be prevented by band limit up to a frequency equivalent to the Nyquist frequency after reduction. For this reason, a horizontal spatial frequency to be band-limited is defined in accordance with the reduction ratio, thereby setting the LPF characteristic. More specifically, as shown in FIG. 4, the LPF characteristic is set such that the lower the reduction ratio becomes, the smaller the band of the horizontal spatial frequency becomes.

The down-sampling circuit 306 executes reduction processing for the image data band-limited by the variable spatial LPF 305 on the basis of the variable magnification ratio from the reduction control circuit 302. An output terminal 307 outputs the reduced image data output from the down-sampling circuit 306. The output terminal 307 is connected to the input side of the recording signal processing circuit 105. As the digital image data reduction method in the reduction processing circuit 205, a general reduction method such as a reduction method by Bi-Cubic interpolation using a secondary re-sampling filter can suitably be used.

Figure 5:
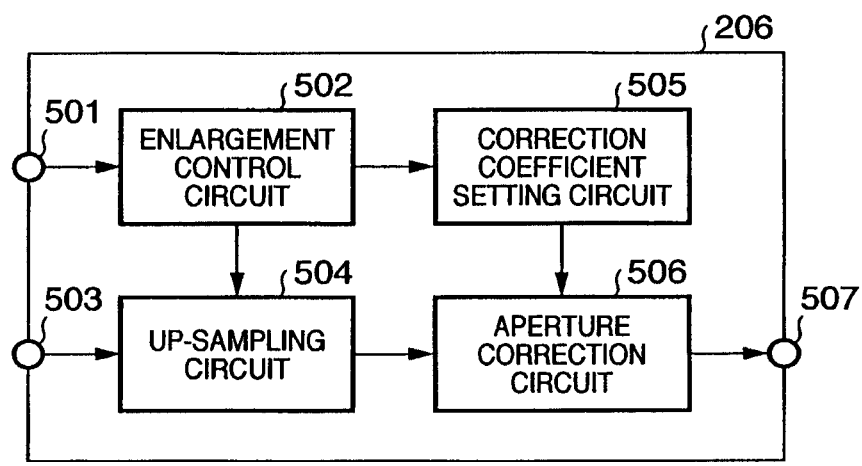
FIG. 5 is a block diagram showing the schematic arrangement of an enlargement processing circuit 206 shown in FIG. 2.

The arrangement of the enlargement processing circuit (a second electronic variable magnification means serving as a second signal processing means) 206 shown in FIG. 2 will be described next. FIG. 5 is a block diagram showing the schematic arrangement of the enlargement processing circuit 206 shown in FIG. 2. An input terminal 501 is connected to the electronic variable magnification control circuit 212 shown in FIG. 2 to receive electronic variable magnification control data from it. An enlargement control circuit 502 specifies the enlargement ratio from the electronic variable magnification control data input from the electronic variable magnification control circuit 212 shown in FIG. 2 through the input terminal 501. The enlargement control circuit 502 controls an up-sampling circuit 504 and a correction coefficient setting circuit 505 (both will be described later) in accordance with the enlargement ratio.

An input terminal 503 is connected to the image sensing signal processing circuit 203 shown in FIG. 2 to receive image data from it. The up-sampling circuit 504 executes enlargement processing for the image data input from the input terminal 503 in accordance with the enlargement ratio from the enlargement control circuit 502. As the digital image data enlargement method in the enlargement processing circuit 206, a general enlargement method such as an enlargement method by Bi-Cubic interpolation using a 2nd-order re-sampling filter can suitably be used.

The correction coefficient setting circuit 505 sets a correction coefficient to be used by an aperture correction circuit 506 (to be described later) in accordance with the enlargement ratio from the enlargement control circuit 502. The aperture correction circuit 506 executes aperture correction processing for correcting the degradation in sharpness of the image due to enlargement processing. As a detailed example of aperture correction processing, an edge enhancement signal is obtained by separating the edge component of the image, multiplied by a predetermined gain, and added to the original image. As described above, the enlargement control circuit 502 controls the up-sampling circuit 504 and also controls the correction coefficient setting circuit 505 in accordance with the variable magnification ratio to control the characteristic of the aperture correction circuit 506.

Figure 6:
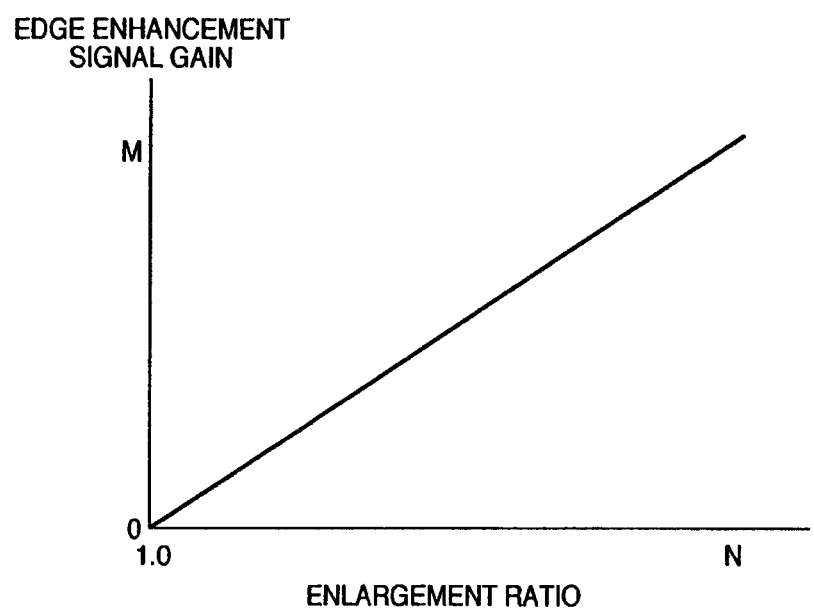
FIG. 6 is a graph showing a control example in which the gain of an edge enhancement signal in aperture correction processing is increased in proportion to the enlargement ratio.

The relationship between aperture correction processing and an enlargement ratio will be described. FIG. 6 is a graph showing a control example in which the gain of an edge enhancement signal in aperture correction processing is increased in proportion to the enlargement ratio. The correction coefficient setting circuit 505 sets, for the aperture correction circuit 506, a correction coefficient which increases the gain of an edge enhancement signal in proportion to the enlargement ratio, as shown in FIG. 6. That is, the enlargement control circuit 502 controls the correction coefficient setting circuit 505 to cause it to set a correction coefficient proportional to the enlargement ratio.

The zoom operation in the second recording mode (moving image mode) in the digital video camera shown in FIG. 1 will be described next. In the following description, the photographing range of an object (the range of an object in image data to be recorded in the recording medium 106) is the view angle.

Figure 9:
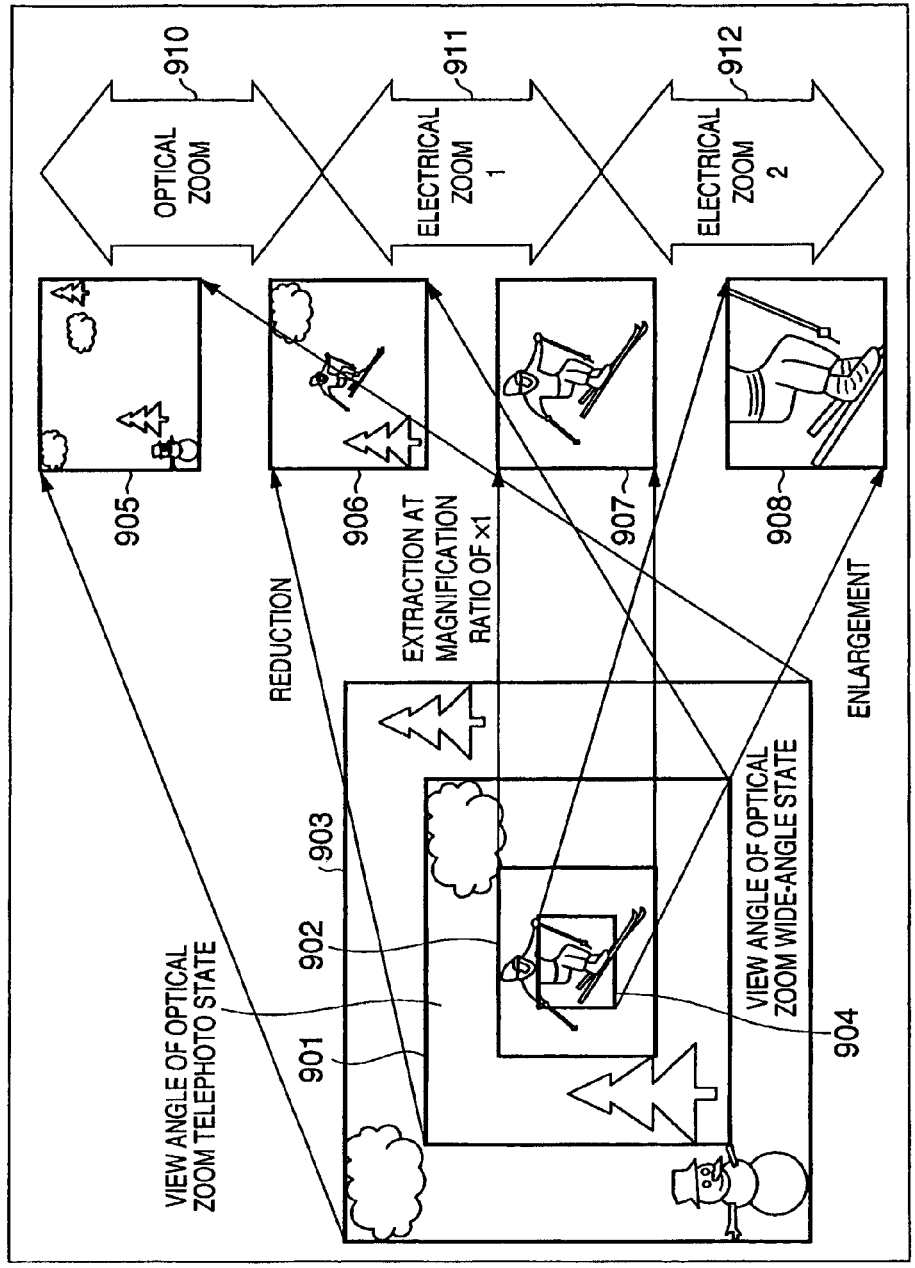
FIG. 9 is a view showing the outline of a zoom operation in the second recording mode in the digital video camera shown in FIG. 1.

FIG. 9 is a view showing the outline of an image magnification ratio and the zoom operation in the second recording mode in the digital video camera shown in FIG. 1. Referring to FIG. 9, a frame 901 indicates a view angle when optical zoom is in the maximum telephoto state. In electrical zoom according to this embodiment, the image sensing element 102 and memory 1 (202) process image sensing data having an image size corresponding to the frame 901. More specifically, the charge read range (scanning range) on the surface (image sensing surface) of the effective pixel region in the image sensing element 102 is the range indicated by the frame 901.

A frame 902 indicates a view angle at which variable magnification processing at a magnification ratio of ×1 can be executed in the second recording mode. The frame 902 indicates an image area corresponding to the recording image size, which is extracted, in the second recording mode, from the image sensing data within the image sensing range indicated by the frame 901. A frame 903 indicates a view angle larger than the frame 901 when optical zoom is in the maximum wide-angle state. A frame 904 indicates a view angle in enlargement processing as the second signal processing by electrical zoom. The frame 904 indicates an image area to be enlarged in the image sensing data having the view angle indicated by the frame 901. As indicated by the frames 901 to 904, the view angle increases toward the wide-angle side and decreases toward the telephoto side. In other words, the image becomes smaller toward the wide-angle side and larger toward the telephoto side.

A recording image 905 in the wide-angle state is the image of moving image data which is recorded in the recording medium 106 at the view angle indicated by the frame 903. A recording image 906 in the maximum telephoto state of optical zoom is the image of moving image data which is recorded in the recording medium 106 at the view angle indicated by the frame 901. A recording image 907 when the image sensing data is processed at a magnification ratio of ×1 is the image of moving image data which is recorded in the recording medium 106 at the view angle indicated by the frame 902. A recording image 908 in enlargement processing by electrical zoom is the image of moving image data which is recorded in the recording medium 106 at the view angle indicated by the frame 904. The sizes of the recording images 905 to 908 correspond to the image sizes of the moving image data, which are image sizes defined by the DV format. As indicated by the recording images 905 to 908, on the basis of image sensing data within the processing range which changes in accordance with a change in view angle, moving image data having an image size defined by a predetermined format is generated and recorded on the recording medium 106.

In the digital video camera, the above-described change in view angle from the frame 903 to the frame 901 is implemented by controlling the lens optical system 101. This view angle change region corresponds to an optical zoom region 910 shown in FIG. 9. The above-described change in view angle from the frame 901 to the frame 902 is implemented by electrical zoom processing (reduction processing) by the camera signal processing circuit 104. This view angle change region corresponds to an electrical zoom 1 region 911 shown in FIG. 9. The above-described change in view angle from the frame 902 to the frame 904 is implemented by electrical zoom processing (enlargement processing as second signal processing) by the camera signal processing circuit 104. This view angle change region corresponds to an electrical zoom 2 region 912 shown in FIG. 9.

As shown even in FIG. 8, in the second recording mode of the digital video camera according to this embodiment, the image size of image sensing data is reduced, and the image data is recorded as moving image data. Hence, electronic variable magnification processing (reduction processing as first signal processing) is executed even in the optical zoom region 910. More specifically, from the maximum telephoto state to the maximum wide-angle state of optical zoom in the optical zoom region 910, optical zooming by the lens optical system 101 is performed under a predetermined electronic magnification (reduction) ratio. The image size of the recording image 907 is the same as that extracted from the image sensing data, as indicated by the frame 902. In this case, since the extracted size equals the recording size, electronic variable magnification ratio=1 (×1).

The variable magnification processing circuit 207 detects that the electronic variable magnification (reduction) ratio has reached the limit. When electronic variable magnification ratio=1, this circuit detects that the electronic variable magnification (reduction) ratio has reached the limit. For example, this corresponds to a case wherein an image having 320×240 pixels should be generated, and image sensing data corresponding to 320×240 pixels is acquired. The circuit may be designed to detect that the electronic variable magnification (reduction) ratio has reached the limit when the electronic variable magnification ratio has reached a predetermined value approximate to electronic variable magnification ratio=1.

In this embodiment, for the descriptive convenience, electronic variable magnification ratio=1 applies to both the horizontal and vertical directions. However, the present invention is not limited to this. For example, when the second recording mode is a DV format recording mode, sampling is done on the basis of a moving image data standard except a square matrix, and the image sensing element 102 has a square matrix, processing at a magnification ratio of ×1 is executed in one of the horizontal and vertical directions. For the other direction, adjustment by electronic variable magnification processing is necessary (≠×1)

As indicated by the electrical zoom 1 region 911, from the frame 901 in the maximum telephoto state of optical zoom to the frame 902 corresponding to extraction at a magnification ratio of ×1, the electrical zoom effect is obtained by changing the extraction image size in accordance with electronic variable magnification (reduction) processing such that a predetermined recording image size can be obtained. When the view angle changes from the frame 902 to the frame 904, it means that extraction image size is smaller than recording image size. In this case, enlargement processing is executed. That is, an electronic variable magnification ratio is larger than 1. More specifically, from the frame 902 corresponding to extraction at a magnification ratio of ×1 to the frame 904 corresponding to the upper limit (maximum magnification ratio) of electrical zoom, the electrical zoom effect is obtained by changing the extraction image size in accordance with electronic variable magnification (enlargement) processing for a predetermined recording image size.

Processing of a maximum magnification ratio selection value which is input from the maximum magnification ratio setting circuit 109 shown in FIG. 1 to the terminal 214 shown in FIG. 2 will be described next. The zoom magnification ratio control circuit 211 changes the control method of the optical zoom control circuit 216 and electronic variable magnification control circuit 212 in a mode corresponding to the maximum magnification ratio selection value input to the terminal 214, thereby changing the zoom control range by zoom operation key input. A setting example of the maximum magnification ratio selection value will be described here by using a detailed example of the maximum magnification ratio selection switch 111. FIG. 13 is a view showing a detailed example of the maximum magnification ratio selection switch 111. As shown in FIG. 13, the maximum magnification ratio selection switch 111 is a maximum magnification ratio setting menu by, e.g., a GUI (Graphical User Interface) displayed on the viewfinder 114 of the digital video camera. This can be implemented by mounting, in the digital video camera, a program which implements the above-described GUI and a CPU which executes the program.

Referring to FIG. 13, a setting menu item display 1301 contains setting menu items such as "camera shake correction", "electrical zoom", and "white balance". An electrical zoom setting item 1302 is a list of setting items related to the electrical zoom function (in this example, the maximum variable magnification ratio), including three items "OFF", "×2" and "×8". The electrical zoom setting item 1302 is displayed by selecting "electrical zoom" in the setting menu item display 1301. Referring to FIG. 13, "electrical zoom" in the setting menu item display 1301 is selected, as indicated by an arrow 1303. Referring to FIG. 13, "×2" as the second mode in the electrical zoom setting item 1302 is selected, as indicated by an arrow 1304.

The operator of the digital video camera selects the "electrical zoom" menu, i.e., the maximum magnification ratio selection item, from the setting menu item display 1301 by moving the arrow 1303.

Figure 14:
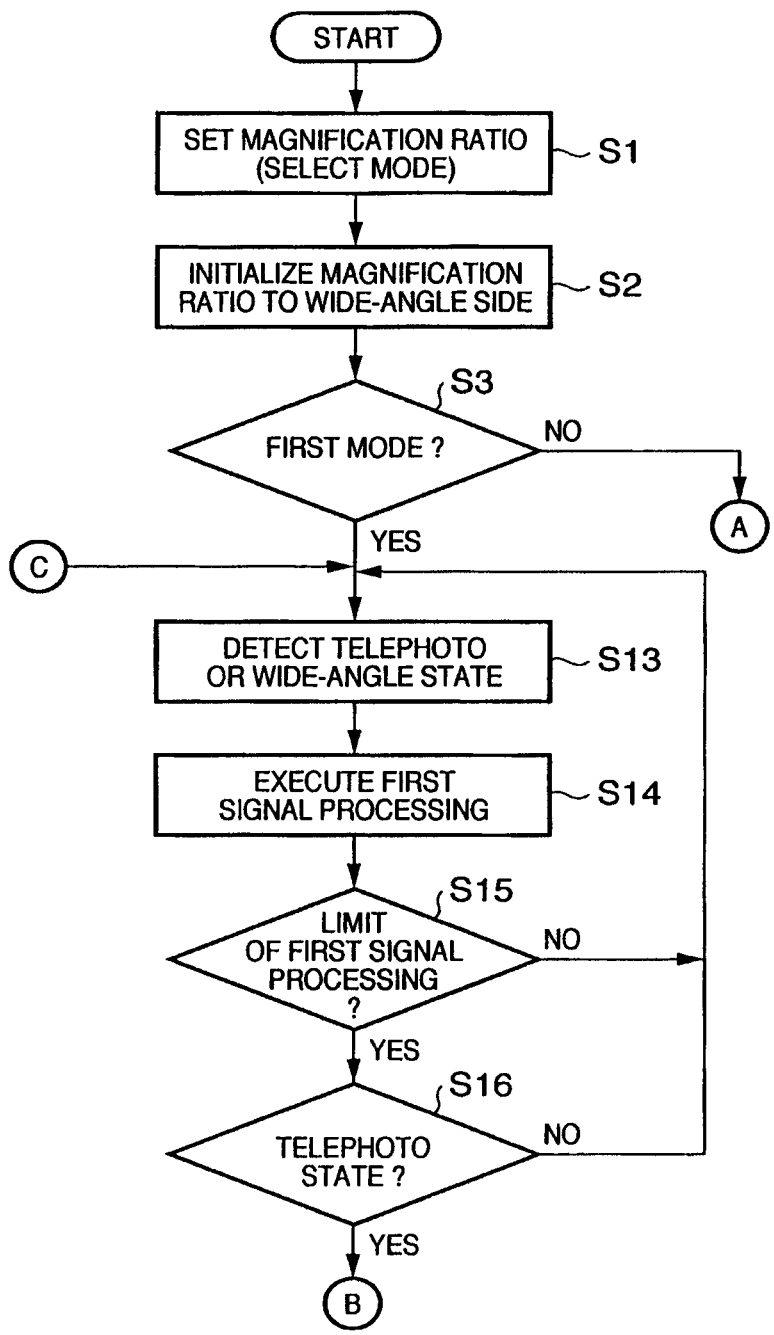
FIG. 14 is a flow chart showing the operation flow of zoom processing corresponding to mode setting in the digital video camera according to the first embodiment.

With this operation, a mode is set. This operation can be expressed by the flows shown in FIGS. 14, 15, and 16. As shown in FIG. 14, first, a magnification ratio is set (a mode is set), as described above (step S1). Accordingly, the electrical zoom setting item 1302 is displayed. After that, the camera signal processing circuit 104 issues an instruction to set the magnification ratio to the wide-angle side (initialization) (step S2).

When the item "OFF" in the electrical zoom setting item 1302 is selected, only the optical zoom region 910 shown in FIG. 9 is used. That is, photographing can be executed from the recording image 905 to the recording image 906 in FIG. 9.

Figure 15:
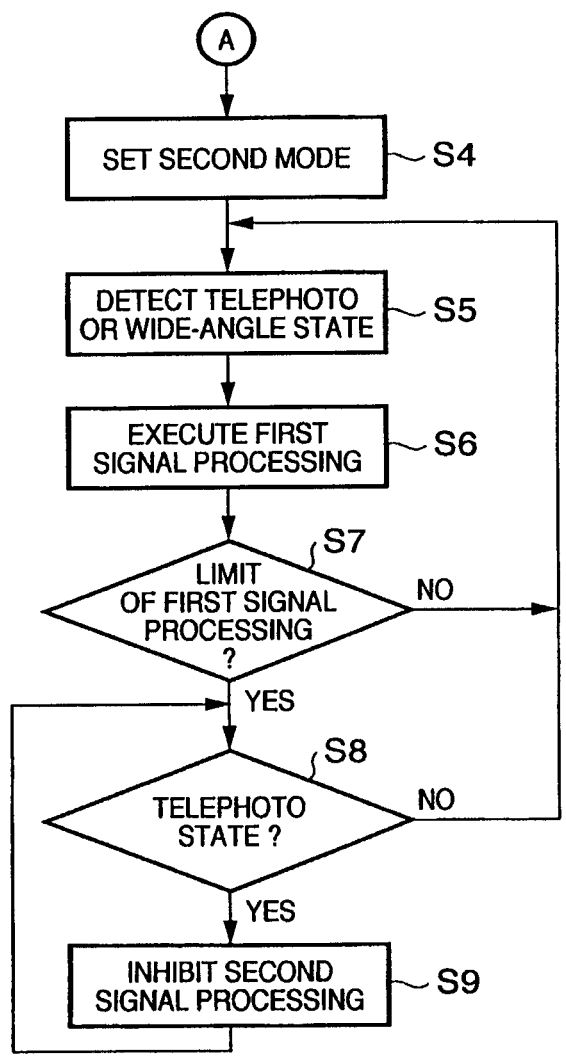
FIG. 15 is a flow chart showing the operation flow of zoom processing corresponding to mode setting in the digital video camera according to the first embodiment.

When the item "×2" as the second mode is selected (NO in step S3 and step S4), the optical zoom region 910 and electrical zoom 1 region (reduction mode region) 911 in FIG. 9 are used. In this case, photographing can be executed from the recording image 905 to the recording image 907. As shown in FIG. 15, when it is detected that movement from the wide-angle side to the telephoto side is selected by the zoom operation key 112 (step S5), the variable magnification processing circuit 204 executes reduction processing as first signal processing under the control of the zoom control circuit (step S6). If it is detected that the increase in image magnification ratio by the reduction processing has reached the limit (YES in step S7), the above-described enlargement processing is inhibited (step S9) even when it is continuously detected that movement from the wide-angle side to the telephoto side is still selected by the zoom operation key 112 (YES in step S8). If it is not detected that the increase in image magnification ratio by the reduction processing in step S6 has reached the limit (NO in step S7), the flow returns to step S5 to detect the operation (telephoto or wide-angle) of the zoom operation key 112. If YES in step S7, and it is not detected that movement from the wide-angle side to the telephoto side is still selected by the zoom operation key 112 (NO in step S8), the flow returns to step S5.

When the item "×8" as the first mode is selected (YES in step S3), the optical zoom region 910, electrical zoom 1 region (reduction mode region as the first mode) 911, and electrical zoom 2 region (enlargement mode region as the second mode) 912 in FIG. 9 are used. In this case, photographing can be executed from the recording image 905 to the recording image 908. As shown in FIG. 14, when it is detected that movement from the wide-angle side to the telephoto side is selected by the zoom operation key 112 (step S13), the variable magnification processing circuit 204 executes reduction processing as first signal processing under the control of the zoom control circuit (step S14). If it is detected that the increase in image magnification ratio by the reduction processing has reached the limit (YES in step S15), and it is detected that movement from the wide-angle side to the telephoto side is still selected by the zoom operation key 112 (YES in step S16), the above-described enlargement processing is executed as second signal processing shown in FIG. 16 (step S17). If it is not detected that the increase in image magnification ratio by the reduction processing in step S14 has reached the limit (NO in step S15), the flow returns to step S13 to detect the operation (telephoto or wide-angle) of the zoom operation key 112. If YES in step S15, and it is not detected that movement from the wide-angle side to the telephoto side is still selected by the zoom operation key 112 (NO in step S16), the flow returns to step S13.

Figure 16:
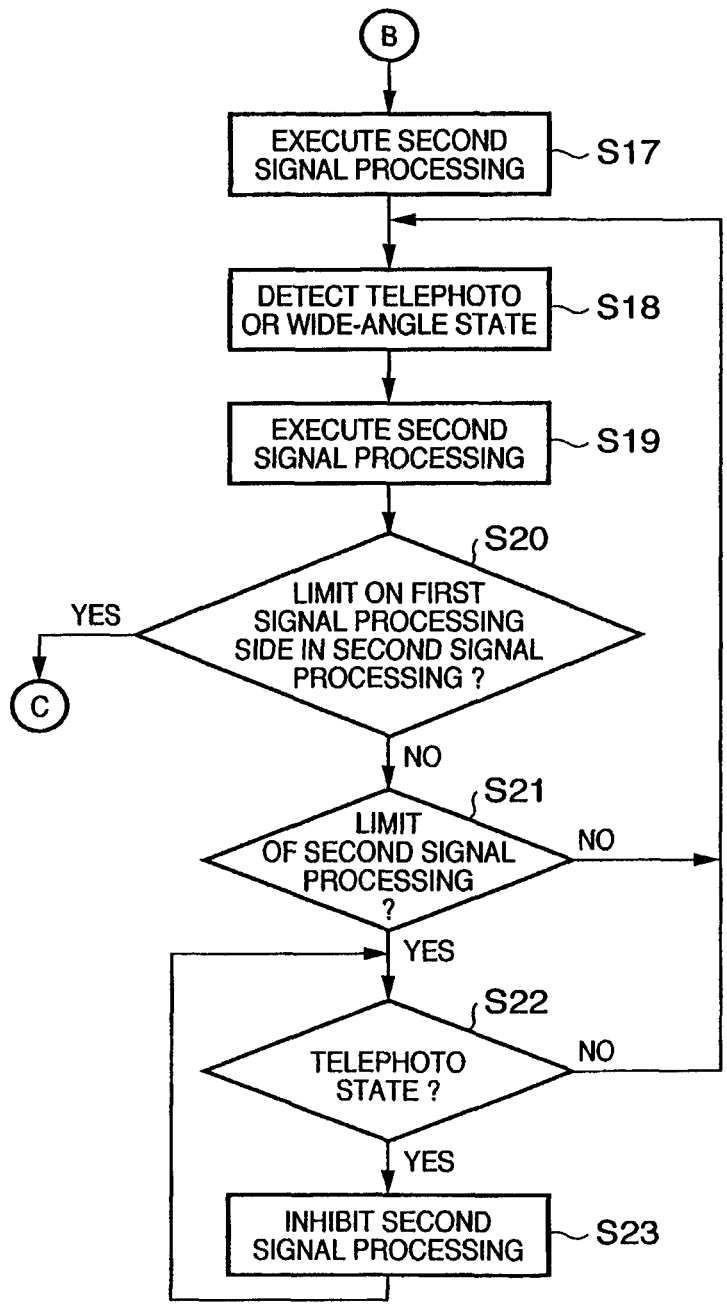
FIG. 16 is a flow chart showing the operation flow of zoom processing corresponding to mode setting in the digital video camera according to the first embodiment.

After processing in step S17 in FIG. 16, the telephoto state or wide-angle state is detected, and the second signal processing is repeated (steps S18 and S19, NO in step S20, and NO in step S21). When the magnification ratio returns to the limit value of the increase in magnification ratio by the above-described reduction processing (YES in step S20), the flow returns to step S13 in FIG. 14 to start the flow of first signal processing. Note that returning the magnification ratio to the limit value of the increase in magnification ratio by the reduction processing means that the magnification ratio in the second signal processing reaches, by reduction processing, the limit on the first signal processing side (the side of the electrical zoom 1 region 911 in FIG. 9).

On the other hand, assume that the magnification ratio does not return to the limit value of the increase in magnification ratio by the above-described reduction processing (NO in step S20), it is continuously detected in step S18 that movement from the wide-angle side to the telephoto side is still selected, and the magnification ratio has reached the limit of the enlargement processing as the second signal processing (YES in step S21). In this case, even when it is continuously detected that movement from the wide-angle side to the telephoto side is selected by the zoom operation key 112 (YES in step S22), the above-described enlargement processing as the second signal processing is inhibited (step S23). If it is continuously detected in step S18 that movement from the wide-angle side to the telephoto side is selected, and the magnification ratio has not reached the limit of the enlargement processing as the second signal processing (NO in step S21), the flow returns to step S18 to detect the operation (telephoto or wide-angle) of the zoom operation key 112. If YES in step S21, and it is not detected that movement from the wide-angle side to the telephoto side is selected by the zoom operation key 112 (NO in step S22), the flow returns to step S18.

As described above, by setting the maximum magnification ratio selection switch 111, the zoom magnification ratio "×2" until electronic variable magnification is executed as the reduction operation under the control of the zoom control circuit 211 can be selected as the maximum variable magnification ratio so that the second mode can be selected and set. Accordingly, the operator can select and set a new zoom mode in which electronic enlargement processing causes no degradation in image quality, and the zoom magnification ratio can be set higher than in only optical zoom. In addition, the electronic variable magnification control circuit 212 controls the extraction area size in reading out image sensing data from the variable magnification processing circuit 204 and memory 1 (202) under the control of the zoom control circuit 211, thereby executing the electrical zoom operation for enlargement/reduction, as described above.

The variable magnification processing selection circuit 207 selects, under the control of the electronic variable magnification control circuit 212, the output from the reduction processing circuit 205 for a variable magnification ratio in the first signal processing in which electronic variable magnification is executed as reduction processing. The variable magnification processing selection circuit 207 selects the output from the enlargement processing circuit 206 for a variable magnification ratio in the second signal processing in which electronic variable magnification is executed as enlargement processing. For a variable magnification ratio in electronic variable magnification at a magnification ratio of ×1 (e.g., when an image having 320×240 pixels should be generated and recorded, and image sensing data corresponding to 320× 240 pixels is acquired), the variable magnification processing selection circuit 207 selects the output from the image sensing signal processing circuit 203 without intervening variable magnification processing. That is, the output from the reduction processing circuit 205 is selected in the optical zoom region 910 and electrical zoom 1 region 911. The output from the image sensing signal processing circuit 203 is selected in extraction at a magnification ratio of ×1. The output from the enlargement processing circuit 206 is selected in the electrical zoom 2 region 912.

When the sampling matrix of the image sensing element 102 is different from that in the recording mode, as described above, processing at a magnification ratio of ×1 is executed in one of the horizontal and vertical directions. For the other direction, electronic variable magnification ratio #1. In this case, even in the processing at a magnification ratio of ×1, horizontal or vertical electronic variable magnification processing must be executed. In accordance with the electronic variable magnification ratio, the output from the reduction processing circuit 205 or enlargement processing circuit 206 is selected.

Figure 7:
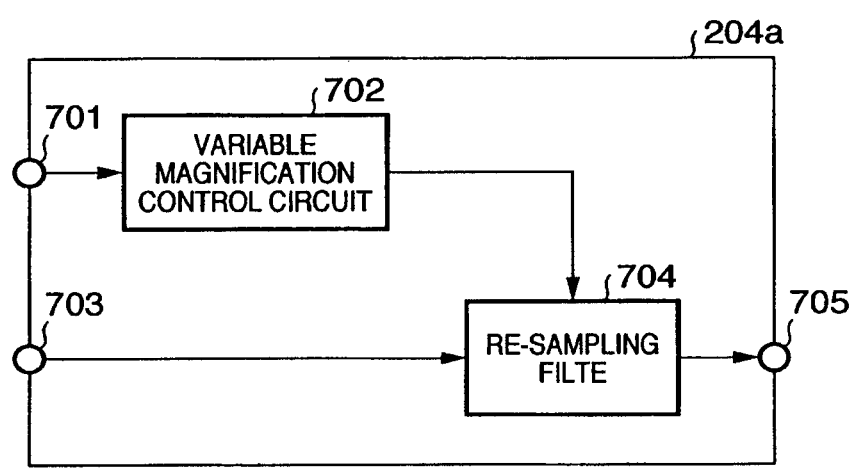
FIG. 7 is a block diagram showing the schematic arrangement of a variable magnification processing circuit 204a which has an arrangement different from that of the variable magnification processing circuit 204 shown in FIGS. 2, 3, and 5.

The schematic arrangement of a variable magnification processing circuit 204*a* having an arrangement different from that of the variable magnification processing circuit 204 shown in FIGS. 2, 3, and 5 will be described next. FIG. 7 is a block diagram showing the schematic arrangement of the variable magnification processing circuit 204*a* which has an arrangement different from that of the variable magnification processing circuit 204 shown in FIGS. 2, 3, and 5. That is, the variable magnification processing circuit 204*a* shown in FIG. 7 may replace the variable magnification processing circuit 204 shown in FIG. 2. The variable magnification processing circuit 204*a* shown in FIG. 7 uses the same re-sampling filter algorithm for enlargement and reduction. The enlargement and reduction are switched only by controlling the variable magnification coefficient so that the circuit has a simpler arrangement than that of the variable magnification processing circuit 204 shown in FIG. 2.

Referring to FIG. 7, an input terminal 701 is connected to the electronic variable magnification control circuit 212 shown in FIG. 2 to receive electronic variable magnification control data from it. A variable magnification control circuit 702 specifies the variable magnification ratio from the electronic variable magnification control data input from the electronic variable magnification control circuit 212 through the input terminal 701 and controls a re-sampling filter 704 (to be described later) in accordance with the variable magnification ratio. An input terminal 703 is connected to the image sensing signal processing circuit 203 shown in FIG. 2 to receive image data from it. The re-sampling filter 704 enlarges or reduces the image data input from the input terminal 703 in accordance with the variable magnification ratio input from the variable magnification control circuit 702.

An operation for causing the zoom control circuit 211 shown in FIG. 2 to supply a zoom magnification ratio indication output corresponding to the zoom operation key input to the zoom magnification ratio indication circuit 110 shown in FIG. 1 and causing the viewfinder 114 to display the zoom magnification ratio, and display examples will be described next. FIG. 10 is a view showing an example of zoom magnification ratio indication on the viewfinder 114 in which a photographing image is confirmed. Referring to FIG. 10, a zoom magnification ratio indicator 1001 includes an indicator 1002 which indicates the zoom magnification ratio during photographing by the digital video camera in a scale having the maximum wide-angle state and the maximum telephoto state at two ends. "W" represents the maximum wide-angle state, and "T" represents the maximum telephoto state in FIG. 10. The indicator 1002 moves on the scale as the optical zoom magnification ratio or electrical zoom magnification ratio controlled by the zoom control circuit 211 changes in accordance with the zoom operation key input.

Figure 11A:
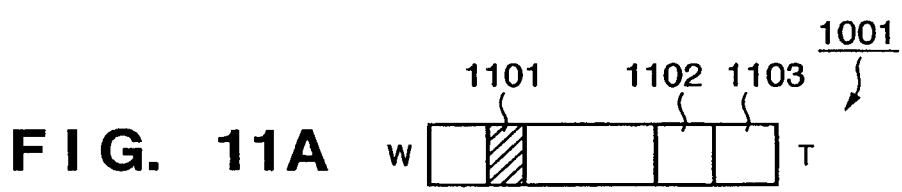
FIGS. 11A to 11C are views showing display examples of boundary lines between variable magnification ratios on a zoom magnification ratio indicator 1001.
Figure 11B:
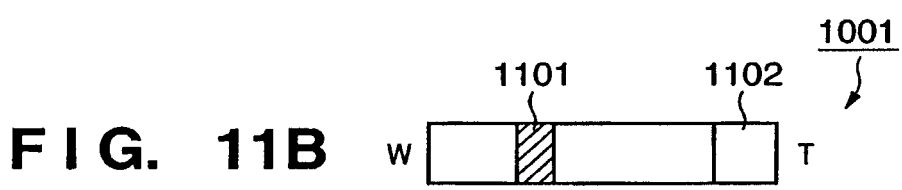
Figure 11C:
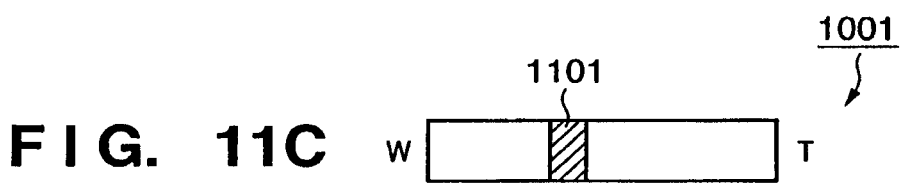

Display of boundary lines between variable magnification ratios on the zoom magnification ratio indicator 1001 will be described next. FIGS. 11A to 11C are views showing display examples of boundary lines between variable magnification ratios on the zoom magnification ratio indicator 1001. FIG. 11A shows a display example of the zoom magnification ratio indicator 1001 when zooming can be executed in the optical zoom region 910, electrical zoom 1 region 911, and electrical zoom 2 region 912 shown in FIG. 9. At this time, setting by the maximum magnification ratio selection switch 111 corresponds to "×8" in the electrical zoom setting item 1302 shown in FIG. 13. Referring to FIG. 11A, an indicator 1101 indicates the current zoom magnification ratio. A boundary line 1102 indicates the upper limit of optical zoom (the maximum wide-angle state in the optical zoom region 910 in FIG. 9). A boundary line 1103 indicates the upper limit of electrical zoom 1 (the boundary between the electrical zoom 1 region 911 and the electrical zoom 2 region 912 in FIG. 9). The maximum telephoto state represented by "T" corresponds to the recording image 908 in FIG. 9 when the maximum magnification ratio is "×8".

FIG. 11B shows a display example of the zoom magnification ratio indicator 1001 when zooming can be executed in the optical zoom region 910 and electrical zoom 1 region 911 shown in FIG. 9. At this time, setting by the maximum magnification ratio selection switch 111 corresponds to "×2" in the electrical zoom setting item 1302 shown in FIG. 13. The maximum telephoto state represented by "T" corresponds to the recording image 907 in FIG. 9 when the maximum magnification ratio is "×2".

FIG. 11C shows a display example of the zoom magnification ratio indicator 1001 when zooming can be executed in the optical zoom region 910 shown in FIG. 9. At this time, setting by the maximum magnification ratio selection switch 111 corresponds to "OFF" in the electrical zoom setting item 1302 shown in FIG. 13. The maximum telephoto state represented by "T" corresponds to the recording image 906 (FIG. 9) in the maximum telephoto state of optical zoom.

Figure 12A:
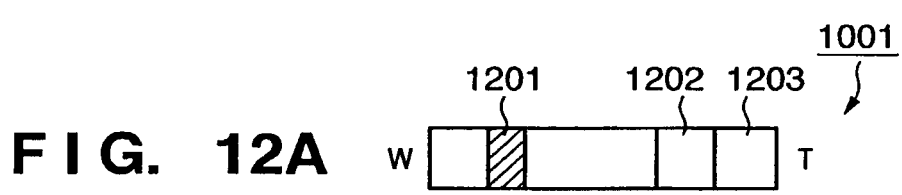
FIGS. 12A to 12C are views showing examples of the zoom magnification ratio indicator 1001 different from FIGS. 11A to 11C.
Figure 12B:
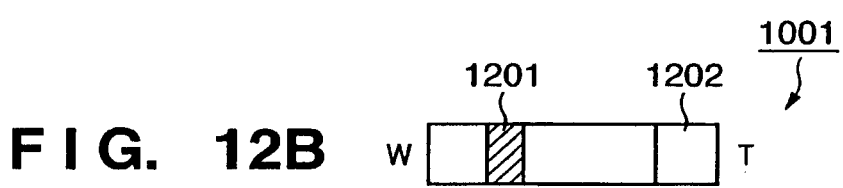
Figure 12C:
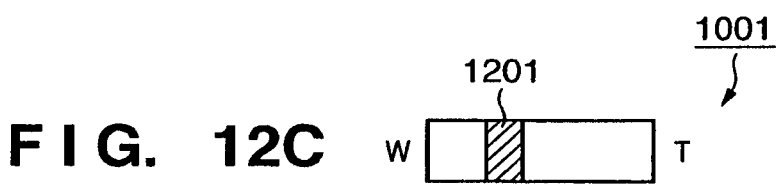

Examples of the zoom magnification ratio indicator 1001 different from FIGS. 11A to 11C will be described next. FIGS. 12A to 12C are views showing examples of the zoom magnification ratio indicator 1001 different from FIGS. 11A to 11C. The zoom magnification ratio indicator 1001 shown in FIGS. 11A to 11C can be scaled (i.e., the zoom magnification ratio indicator 1001 has a predetermined length). However, FIGS. 12A to 12C show display examples in which the scale of the zoom magnification ratio indicator 1001 is fixed (i.e., the length of the zoom magnification ratio indicator 1001 changes).

FIG. 12A shows a display example of the zoom magnification ratio indicator 1001 when zooming can be executed in the optical zoom region 910, electrical zoom 1 region 911, and electrical zoom 2 region 912 shown in FIG. 9. Referring to FIG. 12A, an indicator 1201 indicates the current zoom magnification ratio. A boundary line 1202 indicates the upper limit of optical zoom (the maximum wide-angle state in the optical zoom region 910 in FIG. 9). A boundary line 1203 indicates the upper limit of electrical zoom 1 (the boundary between the electrical zoom 1 region 911 and the electrical zoom 2 region 912 in FIG. 9). As described above, FIG. 12A corresponds to FIG. 11A described above, and the display form and display contents are the same.

FIG. 12B shows a display example of the zoom magnification ratio indicator 1001 when zooming can be executed in the optical zoom region 910 and electrical zoom 1 region 911 shown in FIG. 9. The zoom magnification ratio indicator 1001 shown in FIG. 12B is shorter than that in FIG. 12A (even that in FIG. 11B) by a length corresponding to the electrical zoom 2 region 912.

FIG. 12C shows a display example of the zoom magnification ratio indicator 1001 when zooming can be executed in the optical zoom region 910 shown in FIG. 9. The zoom magnification ratio indicator 1001 shown in FIG. 12C is shorter than that in FIG. 12A (even that in FIG. 11C) by a length corresponding to the electrical zoom 1 region 911 and electrical zoom 2 region 912.

As described above, the zoom magnification ratio indicator 1001 displayed on the viewfinder 114 can have an arbitrary shape. The zoom magnification ratio may also be indicated by a numerical value. When a boundary line is shown as described above, the user can be notified of the start of electrical zoom (reduction processing), the start of electrical zoom (enlargement processing), or the maximum magnification ratio set state.

As the second embodiment of the present invention, a digital video camera (image recording apparatus) which also has a photographing mode in which the zoom operation is performed only by an optical zoom means without executing electronic variable magnification processing will be described next.

Figure 17:
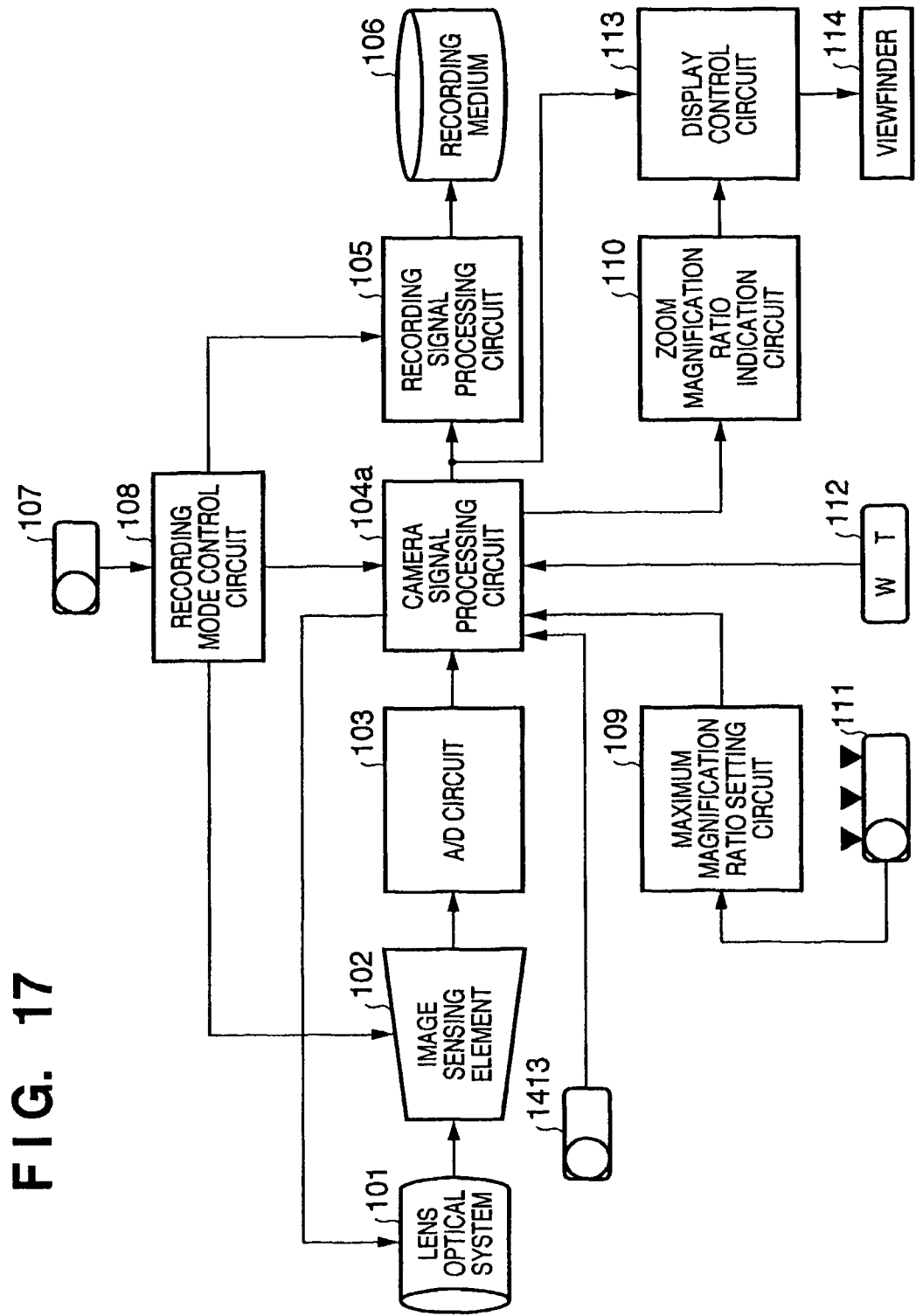
FIG. 17 is a block diagram showing the schematic arrangement of a digital video camera according to the second embodiment of the present invention.

FIG. 17 is a block diagram showing the schematic arrangement of a digital video camera according to the second embodiment of the present invention. The same reference numerals as in the digital video camera shown in FIG. 1 denote constituent components having the same functions in the digital video camera shown in FIG. 17, and a description thereof will be omitted. The digital video camera shown in FIG. 17 is different from that shown in FIG. 1 in a ×1 magnification fixing switch 1413 and a camera signal processing circuit 104a. The different parts will mainly be described.

Referring to FIG. 17, the ×1 magnification fixing switch 1413 sets a photographing mode (second photographing mode) in which the electronic variable magnification ratio is fixed at ×1, and only optical zoom is used or a photographing mode (first photographing mode) in which electronic variable magnification is used. More specifically, when the ×1 magnification fixing switch 1413 is set to the first photographing mode, the digital video camera of this embodiment executes the same photographing operation as that of the digital video camera shown in FIG. 1. When the ×1 magnification fixing switch 1413 is set to the second photographing mode, the digital video camera of this embodiment executes a photographing operation unique to this embodiment. The photographing operation unique to this embodiment will be described later.

When the ×1 magnification fixing switch 1413 is set to the first photographing mode, the camera signal processing circuit 104a has the same function as that of the camera signal processing circuit 104 shown in FIG. 1 and executes various processing operations for converting image sensing data supplied from an A/D circuit 103 into image data, and a detailed description thereof will be omitted. When the ×1 magnification fixing switch 1413 is set to the second photographing mode, the camera signal processing circuit 104a executes zoom processing using only optical zoom, which is unique to this embodiment. In either photographing mode, the camera signal processing circuit 104a controls the optical zoom driving mechanism of a lens optical system 101 to execute optical zooming. The digital video camera shown in FIG. 17 comprises not only the constituent components shown in FIG. 17 but also constituent components prepared in common digital video cameras, including a system controller, a recording medium driving circuit, and a user interface circuit. However, these constituent components are unnecessary for the description of the embodiment of the present invention and therefore are not illustrated.

Figure 18:
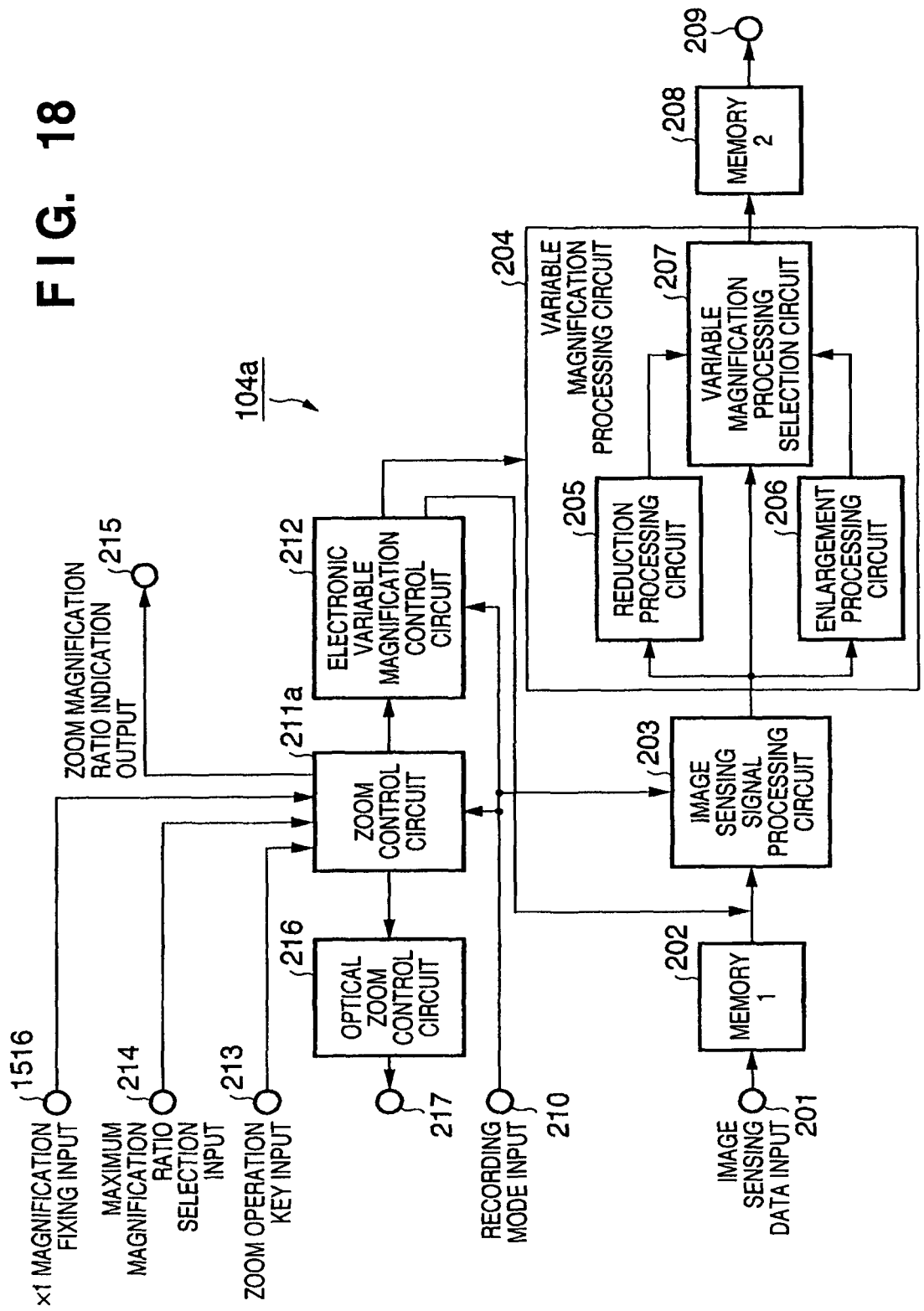
FIG. 18 is a block diagram for explaining details of a camera signal processing circuit 104a shown in FIG. 17.

The camera signal processing circuit 104a shown in FIG. 17 will be described next in detail. FIG. 18 is a block diagram for explaining details of the camera signal processing circuit 104a shown in FIG. 17. As shown in FIG. 18, the camera signal processing circuit 104a has the same arrangement as that of the camera signal processing circuit 104 shown in FIG. 2 except a ×1 magnification fixing input terminal 1516 (to be referred to as an input 1516 hereinafter) and a zoom control circuit 211a, and a description of components having the same reference numerals as in FIG. 2 will be omitted. In accordance with setting of the ×1 magnification fixing switch 1413 input from the terminal 1516, the camera signal processing circuit 104a implements the second photographing mode in which the electronic variable magnification ratio is fixed at ×1, and only optical zoom is used.

More specifically, in the second photographing mode, the zoom control circuit 211a in the camera signal processing circuit 104a instructs an electronic variable magnification control circuit 212 to execute variable magnification processing at a magnification ratio of ×1 and also instructs an optical zoom control circuit 216 to execute zoom processing corresponding to the operation of the zoom operation key. Accordingly, the photographing mode in which the electronic variable magnification ratio is fixed at ×1, and only optical zoom is used can be implemented. At this time, a variable magnification processing selection circuit 207 selects the output from an image sensing signal processing circuit 203, which is processed on the basis of image sensing data extracted from a memory 1 (202) at a magnification ratio of ×1. As described above, when the sampling matrix of an image sensing element 102 is different from that of the recording image format, as described above, processing at a magnification ratio of ×1 is executed in one of the horizontal and vertical directions. For the other direction, electronic variable magnification processing is executed. In this case, even in the processing at a magnification ratio of ×1, horizontal or vertical electronic variable magnification processing must be executed. In accordance with the electronic variable magnification ratio, the output from a reduction processing circuit 205 or enlargement processing circuit 206 is selected. The circuit and variable magnification ratio are fixed once they are selected by the variable magnification processing selection circuit 207.

Zoom processing in the second photographing mode will be described here.

Figure 19:
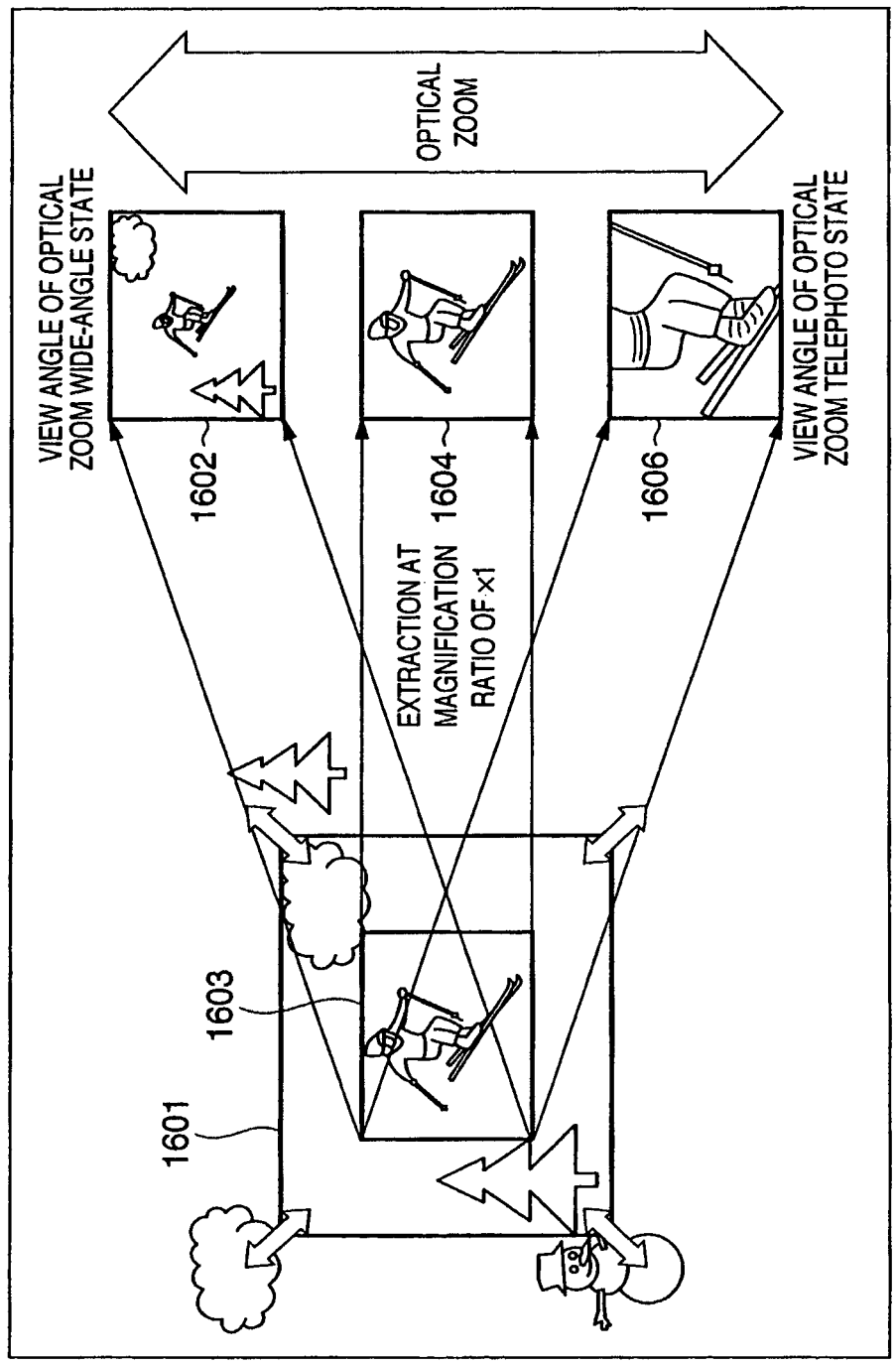
FIG. 19 is a view showing the outline of zoom processing in a second photographing mode.

FIG. 19 is a view showing the outline of zoom processing in the second photographing mode. A frame 1901 indicates a view angle which changes in accordance with the magnification ratio of optical zoom. The image sensing element 102 and memory 1 (202) process image sensing data having an image size corresponding to the frame 1601. The image sensing signal processing circuit 203 extracts an image size corresponding to a frame 1603 from image data held in the memory 1 (202) and executes signal processing. A variable magnification processing circuit 204 outputs the image data output from the image sensing signal processing circuit 203 without executing electronic variable magnification processing. With this arrangement, in the second photographing mode, the digital video camera executes the zoom operation by using only optical zoom. The digital video camera obtains image data corresponding to a recording image 1602 in the maximum wide-angle state or a recording image 1606 in the maximum telephoto state. A recording image 1604 is an image during zooming.

In the above-described second photographing mode, the view angle is different from that in optical zoom with reduction processing described in the first embodiment. However, image recording without any change in image quality due to reduction can be implemented. When the sampling matrix of the image sensing element 102 is different from that of the recording format, as described above, processing at a magnification ratio of ×1 is executed in one of the horizontal and vertical directions. For the other direction, electronic variable magnification processing is executed. Even in this case, since no variable magnification processing is executed in the direction of magnification ratio of ×1, image recording without any degradation in image quality in the direction of magnification ratio of ×1 can be implemented.

As the third embodiment of the present invention, a digital video camera which executes a zoom operation without using an optical zoom means will be described next.

Figure 20:
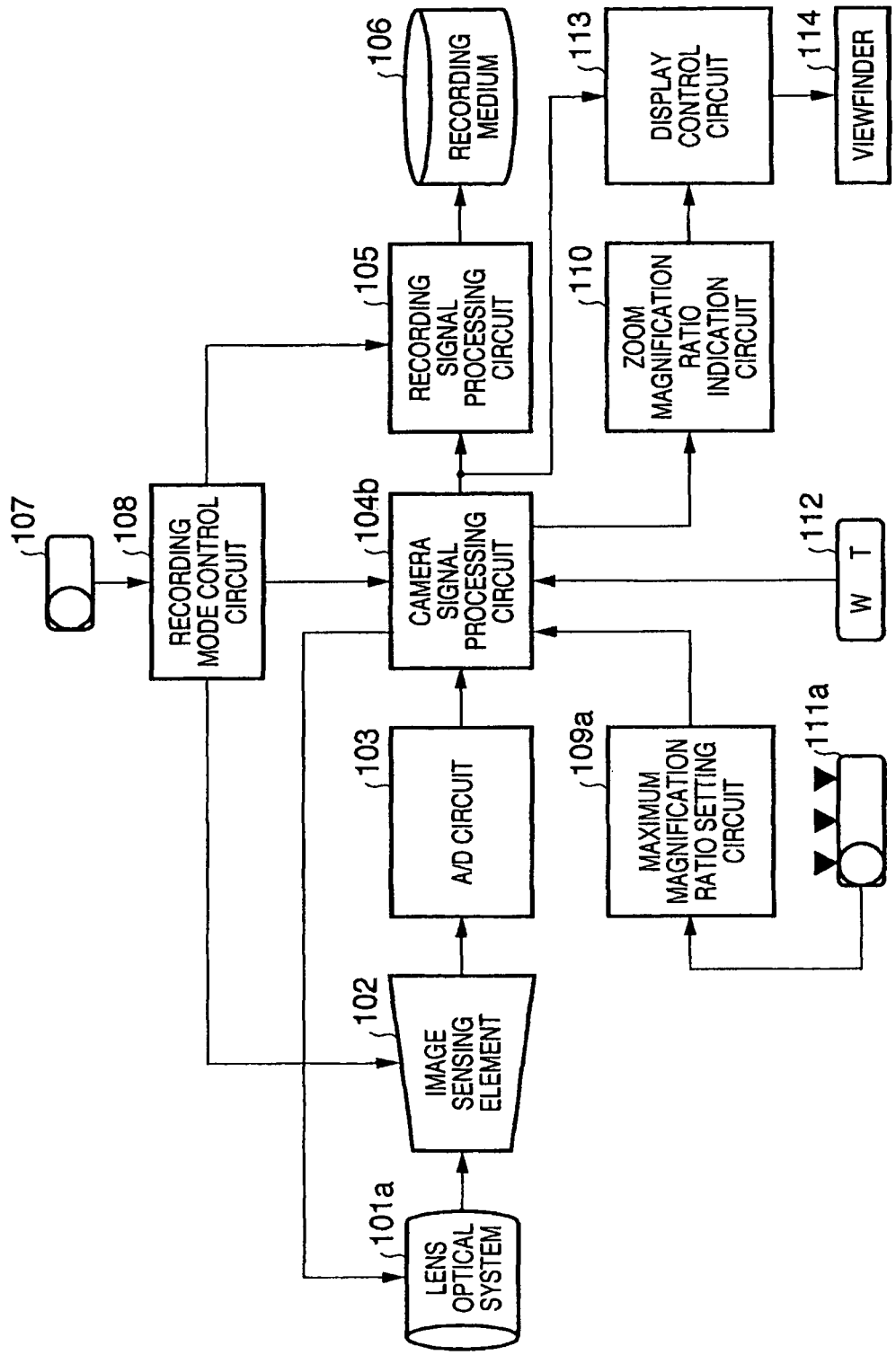
FIG. 20 is a block diagram showing the schematic arrangement of a digital video camera according to the third embodiment of the present invention.

FIG. 20 is a block diagram showing the schematic arrangement of a digital video camera according to the third embodiment of the present invention. The same reference numerals as in the digital video camera shown in FIG. 1 denote constituent components having the same functions in the digital video camera shown in FIG. 20, and a description thereof will be omitted. The digital video camera shown in FIG. 20 is different from that shown in FIG. 1 in a lens optical system 101a, camera signal processing circuit 104b, maximum magnification ratio setting circuit 109a, and maximum magnification ratio selection switch 111a. The different parts will mainly be described.

The lens optical system 101a includes an optical lens which forms an image of incident light on an image sensing element 102, an aperture, a focus controller, various kinds of optical filters, and a driving mechanism for them. The above-described optical mechanism in the lens optical system 101a of the digital video camera shown in FIG. 20 is a common mechanism, and a detailed description thereof will be omitted. In addition, the lens optical system 101a has no zoom function, unlike the lens optical system 101 shown in FIG. 1.

The camera signal processing circuit 104b executes various processing operations for converting image sensing data supplied from an A/D circuit 103 into image data. The processing executed by the camera signal processing circuit 104b will be described later in detail. The maximum magnification ratio setting circuit 109a sets the maximum magnification ratio in the zoom operation in accordance with setting of the maximum magnification ratio selection switch 111a. The setting by the maximum magnification ratio setting circuit 109*a* will be described later in detail. The digital video camera shown in FIG. 20 comprises not only the constituent components shown in FIG. 20 but also constituent components prepared in common digital video cameras, including a system controller, a recording medium driving circuit, and a user interface circuit. However, these constituent components are unnecessary for the description of the embodiment of the present invention and therefore are not illustrated.

The camera signal processing circuit 104*b* shown in FIG. 20 will be described next in detail. FIG. 21 is a block diagram for explaining details of the camera signal processing circuit 104*b* shown in FIG. 20. The same reference numerals as in the camera signal processing circuit 104 shown in FIG. 2 denote constituent components having the same functions in the camera signal processing circuit 104*b* shown in FIG. 21, and a description thereof will be omitted. The camera signal processing circuit 104*b* shown in FIG. 21 has an electrical zoom control circuit 1811, unlike the camera signal processing circuit 104 shown in FIG. 2. This different part will mainly be described.

The electrical zoom control circuit 1811 decides the zoom magnification ratio in accordance with a zoom operation key input for a terminal 214 and controls the image extraction area size from a variable magnification processing circuit 204 and memory 1 (202). In the variable magnification processing circuit 204, an electrical zoom operation corresponding to the zoom magnification ratio decided by the electrical zoom control circuit 1811 is executed. The maximum magnification ratio selection value input to the terminal 214 is processed by the electrical zoom control circuit 1811. The electrical zoom control circuit 1811 outputs zoom magnification ratio indication data to a zoom magnification ratio indication circuit 110 shown in FIG. 20 through a terminal 215. Recording mode data which designates a first recording mode (still image recording mode) or a second recording mode (moving image mode) is input from a recording mode control circuit 108 shown in FIG. 1 to the electrical zoom control circuit 1811 through a terminal 210. This recording mode data is also input to an image sensing signal processing circuit 203, as described above.

The operation of zoom processing in the digital video camera according to the third embodiment will be described here.

FIG. 22 is a view showing the outline of the zoom processing operation in the digital video camera shown in FIG. 20. A frame 1901 indicates a view angle when electrical zoom is in the maximum wide-angle state. The image sensing element 102 and memory 1 (202) process image sensing data having an image size corresponding to the frame 1901. In this embodiment, in the second recording mode, the image sensing data having the image size corresponding to the frame 1901 is reduced and recorded. Reference numeral 1902 denotes a reduced recording image and its image size, which is obtained by reducing the image sensing data having the image size corresponding to the frame 1901 to an image size corresponding to the DV format while keeping the view angle unchanged and recorded in a recording medium 106.

A frame 1903 indicates an extraction area at a magnification ratio of ×1, i.e., a partial image area having an image size equal to the recording image size in the image sensing data with the image size corresponding to the frame 1901. When the image sensing data is to be extracted in correspondence with the frame 1903 and subjected to signal processing, electronic variable magnification ratio=1 (×1) because the extraction size equals the recording size. When the sampling matrix of the image sensing element 102 is different from that of the recording format, processing at a magnification ratio of ×1 is executed in one of the horizontal and vertical directions. For the other direction, electronic variable magnification processing is necessary. A recording image 1904 is obtained by processing an image area corresponding to the frame 1903.

A frame 1905 indicates an extraction image area in the maximum telephoto state, i.e., a partial image area necessary for electrical zoom processing at the maximum variable magnification ratio in the image sensing data with the image size corresponding to the frame 1901. A recording image 1906 is obtained by processing an image area corresponding to the frame 1905.

A change in extraction image area from the above-described frame 1901 to the frame 1903 is implemented by electrical zoom processing (reduction processing) by the camera signal processing circuit 104*b*. The extraction image area change region is an electrical zoom 1 region 1907 shown in FIG. 22. A change in extraction image area from the above-described frame 1903 to the frame 1905 is implemented by electrical zoom processing (enlargement processing) by the camera signal processing circuit 104*b*. This extraction image area change region is an electrical zoom 2 region 1908 shown in FIG. 22.

More specifically, as indicated by the electrical zoom 1 region 1907, the electrical zoom effect is obtained by changing the extraction image size in accordance with electronic variable magnification (reduction) processing for a predetermined recording image size. When the extraction image size changes from the frame 1903 to the frame 1905, extraction image size<recording image size. In this case, enlargement processing is executed at an electronic variable magnification ratio>1. More specifically, from the frame 1903 corresponding to extraction at a magnification ratio of ×1 to the frame 1905 corresponding to the upper limit (maximum magnification ratio) of electrical zoom, the electrical zoom effect is obtained by changing the extraction image size in accordance with electronic variable magnification (enlargement) processing for a predetermined recording image size.

Processing of a maximum magnification ratio selection value which is input from the maximum magnification ratio setting circuit 109*a* shown in FIG. 20 to the terminal 214 shown in FIG. 21 will be described next. The electrical zoom control circuit 1811 changes the control method of the variable magnification processing circuit 204 in correspondence with the maximum magnification ratio selection value input to the terminal 214, thereby changing the zoom control range by zoom operation key input. A setting example of the maximum magnification ratio selection value will be described here by using a detailed example of the maximum magnification ratio selection switch 111*a*. FIG. 25 is a view showing a detailed example of the maximum magnification ratio selection switch 111*a*. As shown in FIG. 25, the maximum magnification ratio selection switch 111*a* is a maximum magnification ratio setting menu by, e.g., a GUI displayed on a viewfinder 114 of the digital video camera. This can be implemented by mounting, in the digital video camera, a program which implements the above-described GUI and a CPU which executes the program.

Referring to FIG. 25, a setting menu item display 2201 contains setting menu items such as "camera shake correction", "electrical zoom", and "white balance". An electrical zoom setting item 2202 is a list of setting items related to the electrical zoom function (in this example, the maximum variable magnification ratio), including two items "×2" and "×8". The electrical zoom setting item 2202 is displayed by selecting "electrical zoom" in the setting menu item display 2201. Referring to FIG. 25, "electrical zoom" in the setting menu item display 2201 is selected, as indicated by an arrow 2203. Referring to FIG. 25, "×8" in the electrical zoom setting item 2202 is selected, as indicated by an arrow 2204.

The operator of the digital video camera selects the "electrical zoom" menu, i.e., the maximum magnification ratio selection item, from the setting menu item display 2201 by moving the arrow 2203. With this operation, the electrical zoom setting item 2202 is displayed.

When the item "×2" in the electrical zoom setting item 2202 is selected, the electrical zoom 1 region (reduction mode region) 1907 in FIG. 22 is used. In this case, photographing can be executed from the recording image 1902 to the recording image 1904. When the item "×8" is selected, the electrical zoom 1 region (reduction mode region) 1907 and electrical zoom 2 region (enlargement mode region) 1908 in FIG. 22 are used. In this case, photographing can be executed from the recording image 1902 to the recording image 1906.

As described above, by setting the maximum magnification ratio selection switch 111a, the zoom magnification ratio "×2" until electronic variable magnification is executed as the reduction operation under the control of the electrical zoom control circuit 1811 can be selected as the maximum variable magnification ratio. Accordingly, the operator can select a zoom mode in which electronic enlargement processing causes no degradation in image quality. In addition, under the control of the electrical zoom control circuit 1811, the extraction image size of image sensing data held in the memory 1 (202) is changed, and the electrical zoom operation for enlargement/reduction corresponding to the variable magnification ratio is executed by the variable magnification processing circuit 204. Extraction control from the memory 1 (202) and variable magnification processing by the variable magnification processing circuit 204 are the same as in the first embodiment, and a description thereof will be omitted.

Figure 23A:
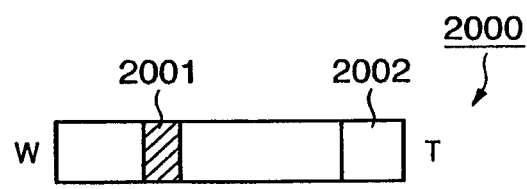
FIGS. 23A and 23B are views showing examples of zoom magnification ratio indication on a viewfinder 114 in which a photographing image is confirmed.
Figure 23B:
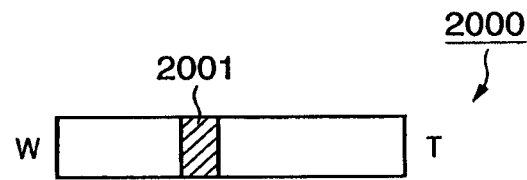
Figure 26:
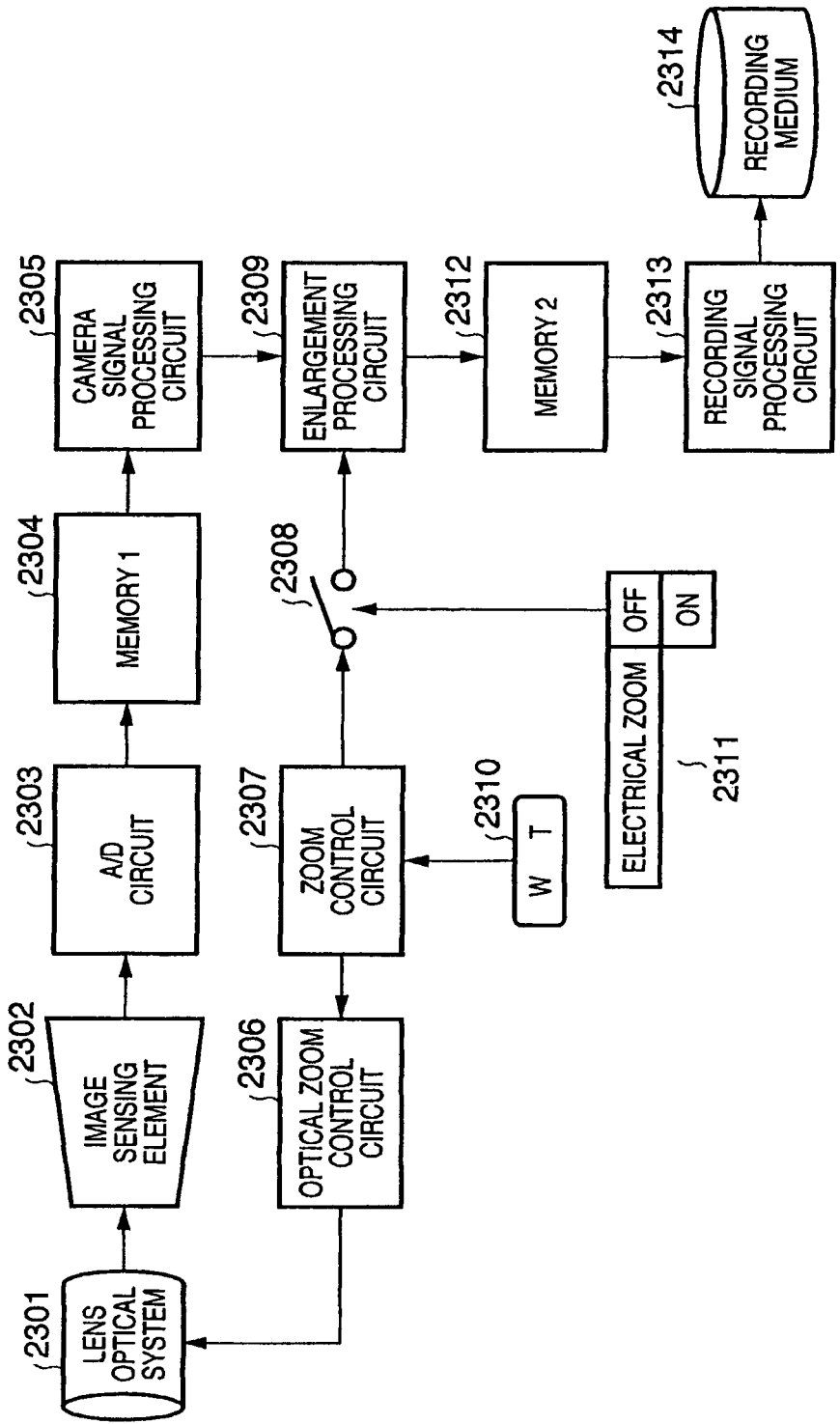
FIG. 26 is a block diagram showing the schematic arrangement of a conventional image recording apparatus having an optical zoom function and an electrical zoom function.
Figure 27:
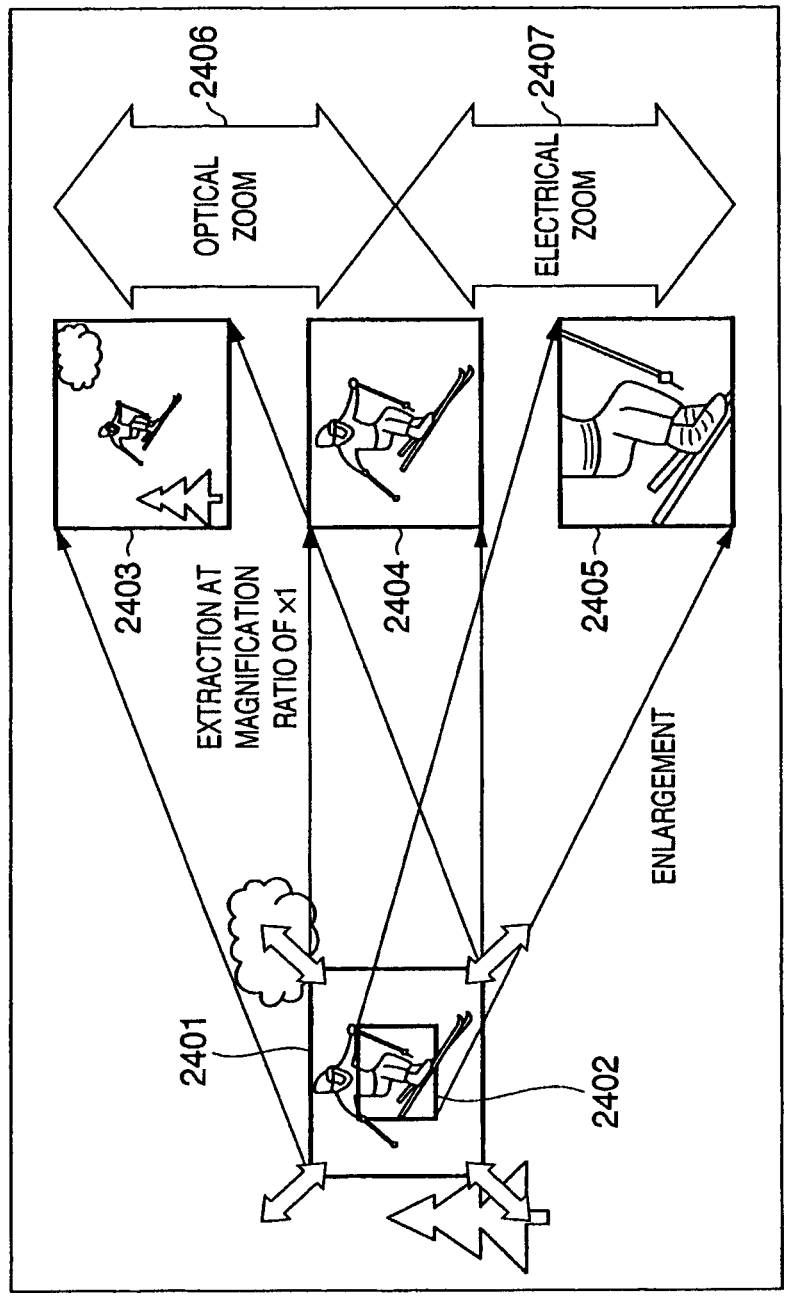
FIG. 27 is a view showing the optical zoom and electrical zoom operations in the image recording apparatus shown in FIG. 26.

An operation for causing the electrical zoom control circuit 1811 shown in FIG. 21 to supply a zoom magnification ratio indication output corresponding to the zoom operation key input to the zoom magnification ratio indication circuit 110 shown in FIG. 20 and causing the viewfinder 114 to display the zoom magnification ratio, and display examples will be described next. FIGS. 23A and 23B are views showing examples of zoom magnification ratio indication on the viewfinder 114 in which a photographing image is confirmed. FIG. 23A shows a display example of the zoom magnification ratio indicator when the maximum variable magnification ratio is the maximum value of electronic variable magnification, and zooming can be executed from the electrical zoom 1 region 1907 to the electrical zoom 2 region 1908 shown in FIG. 22. At this time, setting by the maximum magnification ratio selection switch 111 corresponds to "×8" in the electrical zoom setting item 2202 shown in FIG. 25. Referring to FIG. 23A, a zoom magnification ratio indicator 2000 includes an indicator 2001 which indicates the zoom magnification ratio during photographing by the digital video camera in a scale having the maximum wide-angle state and the maximum telephoto state at two ends. A boundary line 2002 indicates the upper limit of electrical zoom 1 (the boundary between the electrical zoom 1 region 1907 and the electrical zoom 2 region 1908 in FIG. 22). The maximum telephoto state represented by "T" corresponds to the recording image 1906 in FIG. 22 when the maximum magnification ratio is "×8".

FIG. 23B shows a display example of the zoom magnification ratio indicator 2000 when zooming can be executed in the electrical zoom 1 region 1907 shown in FIG. 22. At this time, setting by the maximum magnification ratio selection switch 111a corresponds to "×2" in the electrical zoom setting item 2202 shown in FIG. 25. The maximum telephoto state represented by "T" corresponds to the recording image 1904 in FIG. 22 when the maximum magnification ratio is "×2".

Examples of the zoom magnification ratio indicator 2000 different from FIGS. 23A and 23B will be described next. FIGS. 24A and 24B are views showing examples of the zoom magnification ratio indicator 2000 different from FIGS. 23A and 23B. The zoom magnification ratio indicator 2000 shown in FIGS. 23A and 23B can be scaled (i.e., the zoom magnification ratio indicator 2000 has a predetermined length). However, FIGS. 24A and 24B show display examples in which the scale of the zoom magnification ratio indicator 2000 is fixed (i.e., the length of the zoom magnification ratio indicator 2000 changes).

FIG. 24A shows a display example of the zoom magnification ratio indicator 2000 when zooming can be executed in the electrical zoom 1 region 1907 and electrical zoom 2 region 1908 shown in FIG. 22. Referring to FIG. 24A, an indicator 2101 indicates the current zoom magnification ratio. A boundary line 2102 indicates the upper limit of electrical zoom 1 (the boundary between the electrical zoom 1 region 1907 and the electrical zoom 2 region 1908 in FIG. 22). As described above, FIG. 24A corresponds to FIG. 23A described above, and the display form and display contents are the same.

FIG. 24B shows a display example of the zoom magnification ratio indicator 2000 when zooming can be executed in the electrical zoom 1 region 1907 shown in FIG. 22. The zoom magnification ratio indicator 2000 shown in FIG. 24B is shorter than that in FIG. 24A (even that in FIG. 23B) by a length corresponding to the electrical zoom 2 region 1908. The maximum telephoto state represented by "T" corresponds to the recording image 1904 in FIG. 22 when the maximum magnification ratio is "×2".

The image sensing element 102 is an area sensor which executes color image sensing and in which pixels having a plurality to types of color filters are two-dimensionally arrayed. The image sensing element 102 also has a plurality of types of driving modes which change in accordance with, e.g., the recording mode. More specifically, the image sensing element 102 has a non-cumulative read driving mode in which still image data is photographed, and pixel data of all pixels are read out and a cumulative read driving mode in which moving image data is photographed, and pixel data in the vertical direction are mixed and read out, as described above. The present invention is not limited to the driving modes of the above-described types. The image sensing element may have any other driving modes.

Various control circuits in the digital video camera shown in FIGS. 1 and 2 may be implemented by dedicated hardware. Alternatively, some or all of the control circuits may be constituted by a memory and CPU (Central Processing Unit), and their processing may be implemented by loading a program to implement various kinds of processing in the control units in the memory and executing the program.

The memory is constituted by a nonvolatile memory such as a hard disk device, magnetooptical disk device, or flash memory, a recording medium such as a CD-ROM which can only be read-accessed, a volatile memory such as a RAM (Random Access Memory), or a computer-readable or writable recording medium as a combination thereof.

The functions of various control circuits of the above-described embodiments are also implemented when an operating system (OS) running on a computer performs part or all of actual processing on the basis of instructions of a program read out by the computer.

The functions of various control circuits of the above-described embodiments may also be implemented when program codes read out from a storage medium are written in the memory of a function expansion board inserted into the computer or a function expansion unit connected to the computer, and the CPU of the function expansion board or function expansion unit performs part or all of actual processing on the basis of the instructions of the program codes.

The embodiments of the present invention have been described above in detail with reference to the accompanying drawings. Detailed arrangements are not limited to the above embodiments, and designs without departing from the spirit and scope of the present invention are also incorporated.

As has been described above, in the signal processing apparatus according to the present invention, when the first mode is selected, and the first detection means detects that the telephoto side is continuously selected, first signal processing is executed. When the second detection means detects that the increase in magnification ratio of the image by the first signal processing has reached the limit, second signal processing is subsequently executed to enlarge an image. When the second mode is selected, even when the second detection means detects that the increase in magnification ratio of the image by the first signal processing has reached the limit, and the first detection means then detects that the telephoto side is continuously selected, the second signal processing is inhibited. The user can adjust the zoom ratio of the image by selecting the mode. The user can therefore select a zoom mode with a small degradation in image quality in electrical zoom processing.

In the image data generation apparatus according to the present invention, a maximum variable magnification ratio candidate selected by the user from a plurality of types of maximum variable magnification ratio candidates is set as the maximum variable magnification ratio. In addition, the variable magnification ratio change indication means indicates, as a boundary line, the value of a maximum variable magnification ratio candidate whose variable magnification ratio is lower than that of the maximum variable magnification ratio. Hence, the user can select a desired maximum image zoom ratio. That is, the user can select a zoom mode with a small degradation in image quality in electrical zoom processing. Furthermore, since the value of the maximum variable magnification ratio candidate is indicated as the boundary line, the user can easily grasp the state or influence of electrical zoom processing, and therefore, user can more appropriately select a zoom mode with a small degradation in image quality in electrical zoom processing.

As many apparently widely different embodiments of the present invention can be made without departing from the spirit and scope thereof, it is to be understood that the invention is not limited to the specific embodiments thereof except as defined in the appended claims.

What is claimed is:

1. A signal processing apparatus which changes a magnification ratio of an image acquired by an image Sensor and changes a number of recording pixels, comprising:
   a signal processing unit mounted in the signal processing apparatus to execute a first signal processing for magnifying without pixel interpolation, wherein the signal processing unit executes a second signal processing for magnifying with pixel interpolation; and
   a display control unit mounted in the signal processing apparatus to display an indicator corresponding to a magnification ratio on a scale such that the indicator moves on the scale in accordance with changes in a magnification ratio of an image,
   wherein in a first mode, the first signal processing and the second signal processing are executed, and in a second mode, the second signal processing is not executed,
   wherein said display control unit does not change a length of the scale regardless of whether the first mode or the second mode is selected, and further displays on the scale a magnification range in which the second signal processing is applied if the first mode is selected, and
   wherein the magnification range changes depending on the number of recording pixels.

2. The signal processing apparatus according to claim 1, wherein said signal processing unit further comprises spatial low pass filter to limit a spatial frequency band of the image.

3. The signal processing apparatus according to claim 2, wherein said spatial low pass filter changes a frequency characteristic of the spatial frequency band limit in accordance with a variable magnification ratio.

4. The signal processing apparatus according to claim 1, wherein said signal processing unit further comprises an edge enhancement unit that enhances an edge of an-image.

5. The signal processing apparatus according to claim 4, wherein said edge enhancement unit changes degree of enhancement of the edge in accordance with a variable magnification ratio of said signal processing unit.

6. The signal processing apparatus according to claim 5, wherein in the first mode and the second mode, when the variable magnification ratio of the image acquired by the image sensor is ×1, the first signal processing and the second signal processing are not executed.

7. The signal processing apparatus according to claim 1, wherein the signal of the image is enlarged by the second signal processing.

8. A signal storage apparatus comprising a signal storage unit that stores a signal of an image, wherein the signal of the image processed by a signal processing apparatus of claim 1 is stored in said signal storage unit.

9. An image recording apparatus comprising:
   the signal processing apparatus according to claim 1; and
   an optical variable magnification unit that changes a view angle of an object image formed on a light receiving surface of the image sensor, wherein variable magnification by said optical variable magnification unit is executed in the first signal processing.

10. The signal processing apparatus according to claim 1, in case where the first mode is selected, the second signal processing is performed when the second detection unit detects that the magnification ratio in the first signal processing has reached the limit.

11. A signal processing apparatus which changes a magnification ratio of an image acquired by an image sensor, comprising:
   a signal processing unit mounted in the signal processing apparatus to execute a first signal processing for magnifying without pixel interpolation, wherein the signal processing unit executes a second signal processing for magnifying with pixel interpolation; and
   a display control unit mounted in the signal processing apparatus to display an indicator corresponding to a magnification ratio on a scale such that the indicator moves on the scale in accordance with changes in a magnification ratio of an image,
   wherein in a first mode, the first signal processing and the second signal processing are selectively executed depending on the magnification ratio, and in a second mode, the second signal processing is not executed regardless of the magnification ratio, and wherein said display control unit keeps a length of the scale on a display unchanged even when the mode is switched between the first mode and the second mode.

12. The signal processing apparatus according to claim 11, wherein said signal processing unit further comprises spatial low pass filter to limit a spatial frequency band of the image.

13. The signal processing apparatus according to claim 12, wherein said spatial low pass filter changes a frequency characteristic of the spatial frequency band limit in accordance with a variable magnification ratio.

14. The signal processing apparatus according to claim 11, wherein said signal processing unit further comprises an edge enhancement unit that enhances an edge of an-image.

15. The signal processing apparatus according to claim 14, wherein said edge enhancement unit changes degree of enhancement of the edge in accordance with a variable magnification ratio of said signal processing unit.

16. The signal processing apparatus according to claim 15, wherein in the first mode and the second mode, when the variable magnification atio of the image acquired by the image sensor is ×1, the first signal processing and the second signal processing are not executed.

17. The signal processing apparatus according to claim 11, in a case where the first mode is selected, the second signal processing is performed when the second detection unit detects that the magnification ratio in the first signal processing has reached a predetermined range.

18. An image recording apparatus comprising:
the signal processing apparatus according to claim 11; and
an optical variable magnification unit that changes an optical magnification, wherein variable magnification by said optical variable magnification unit can be executed together with the first signal processing.

* * * * *